(12) United States Patent
Pitbladdo

(10) Patent No.: US 6,748,765 B2
(45) Date of Patent: Jun. 15, 2004

(54) OVERFLOW DOWNDRAW GLASS FORMING METHOD AND APPARATUS

(76) Inventor: Richard B. Pitbladdo, 411 W. Lake Rd., Horseheads, NY (US) 14840

( * ) Notice: Subject to any disclaimer, the term of this patent is extended or adjusted under 35 U.S.C. 154(b) by 318 days.

(21) Appl. No.: 09/851,627

(22) Filed: May 9, 2001

(65) Prior Publication Data

US 2001/0039814 A1 Nov. 15, 2001

Related U.S. Application Data

(60) Provisional application No. 60/245,875, filed on Nov. 4, 2000, provisional application No. 60/227,696, filed on Aug. 24, 2000, provisional application No. 60/219,902, filed on Jul. 21, 2000, provisional application No. 60/206,904, filed on May 25, 2000, provisional application No. 60/205,347, filed on May 18, 2000, and provisional application No. 60/202,581, filed on May 9, 2000.

(51) Int. Cl.[7] ............................................. C03B 17/06
(52) U.S. Cl. ............................. 65/53; 65/121; 65/195
(58) Field of Search ............................. 65/53, 121, 195

(56) References Cited

U.S. PATENT DOCUMENTS

| | | | | |
|---|---|---|---|---|
| 1,697,227 A | * | 1/1929 | Danner | 65/53 |
| 1,731,260 A | * | 10/1929 | Nobbe | 65/53 |
| 1,759,229 A | | 5/1930 | Drake | |
| 1,829,639 A | * | 10/1931 | Fergren | 65/53 |
| 3,338,696 A | | 8/1967 | Dockerty | 65/145 |
| 3,451,798 A | | 6/1969 | Simon | 65/199 |
| 3,506,429 A | * | 4/1970 | Overman | 65/203 |
| 3,589,887 A | * | 6/1971 | Ward | 65/185 |
| 3,607,182 A | * | 9/1971 | Leibowitz | 65/53 |
| 4,214,886 A | * | 7/1980 | Shay et al. | 65/121 |

FOREIGN PATENT DOCUMENTS

| | | |
|---|---|---|
| GB | 982153 | 2/1965 |
| JP | 09110443 | 4/1997 |
| JP | 10291827 | 11/1998 |

* cited by examiner

*Primary Examiner*—Sean Vincent
(74) *Attorney, Agent, or Firm*—Brown & Michaels, PC

(57) ABSTRACT

The disclosure teaches design features that can be used alone or in combination to facilitate faster, more uniform flow of glass through the apparatus and allows the thickness of the sheet to be adjusted. An overflow device is provided at the far end of the trough and is used in conjunction with tilting of the apparatus to expand the range of glass flow rate and glass viscosity for which this invention will produce satisfactory product. The forming apparatus can be made with non-linear weirs and the trough bottom to provide a greater range of flow rates. The glass flow in the inflow pipe can modulated or a contoured trough cross-section used to provide more uniform time dependent flow for forming the sheet. The forming apparatus can include an orifice on top of the trough and glass can be moved through the apparatus using pressure. Additional orifices can be provided on the bottom or sides to allow greater variability in sheet thickness. Irregularities in the thickness of the formed glass sheet may corrected by selective heating of the glass in the trough, heating the weirs or orifice, and selective heating of the glass flowing down the outside of the apparatus. A flow control plug can be inserted into the trough, such that flow dynamics can be altered during hot operation by insertion, removal or position adjustment of the flow control plug.

78 Claims, 24 Drawing Sheets

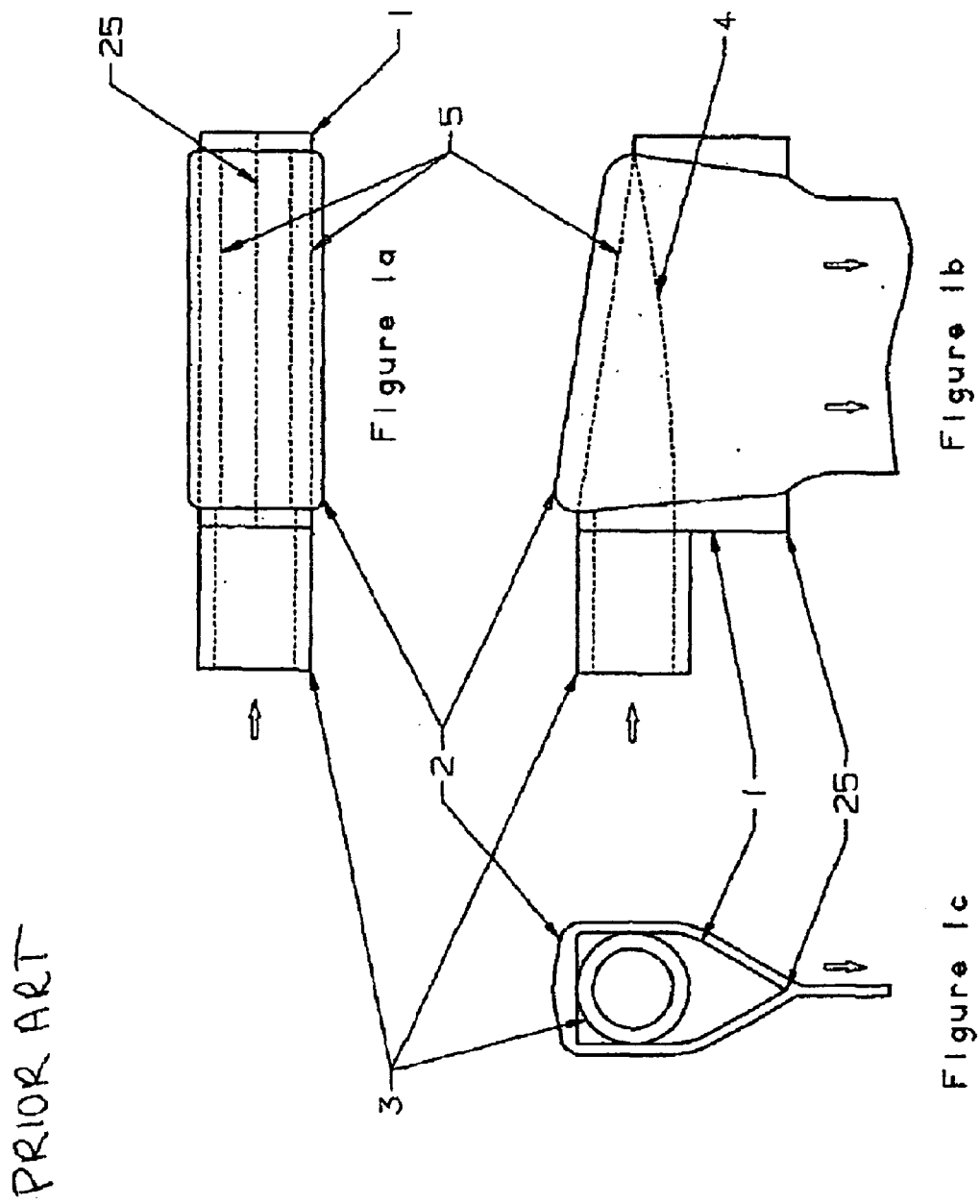

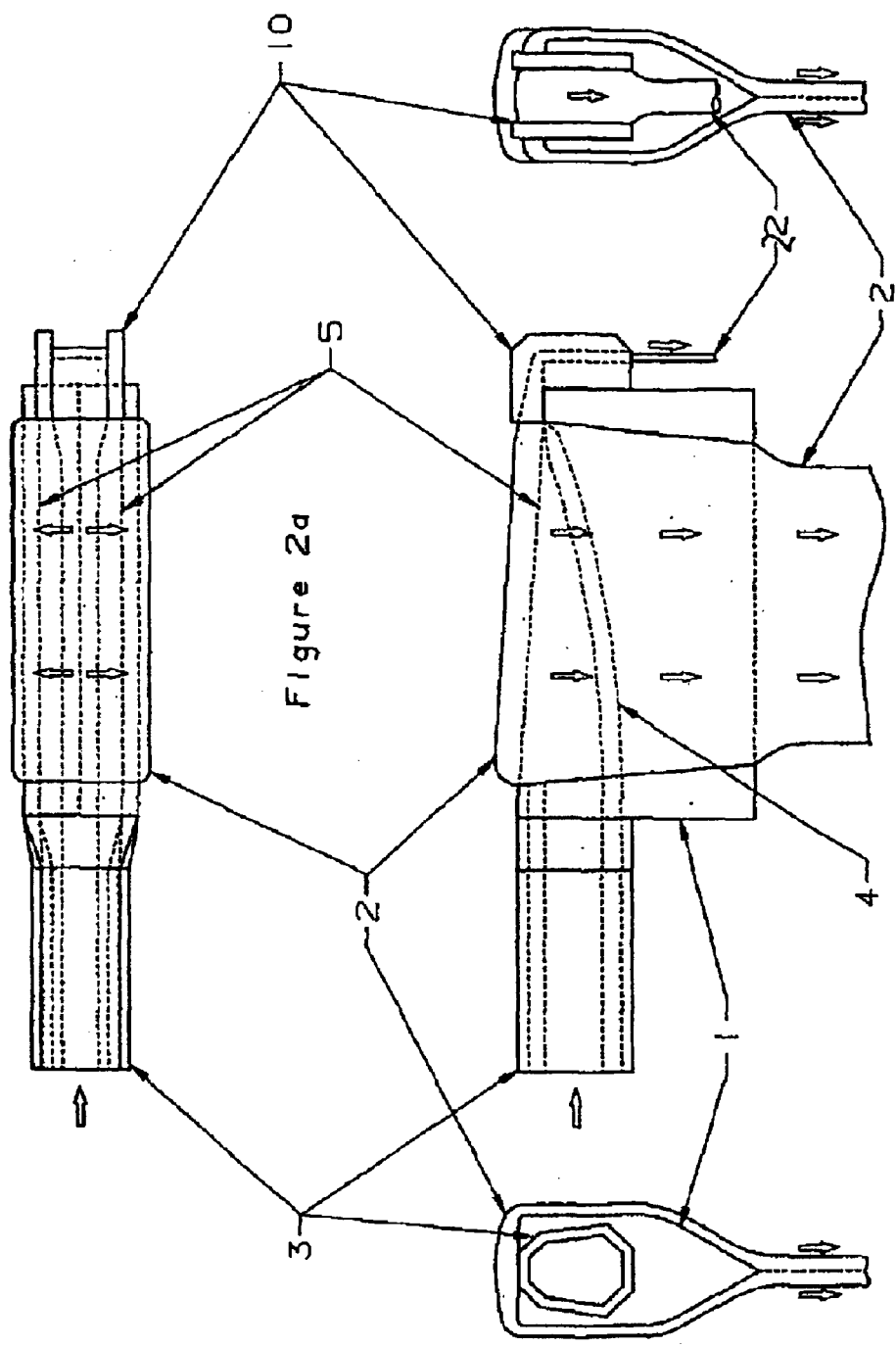

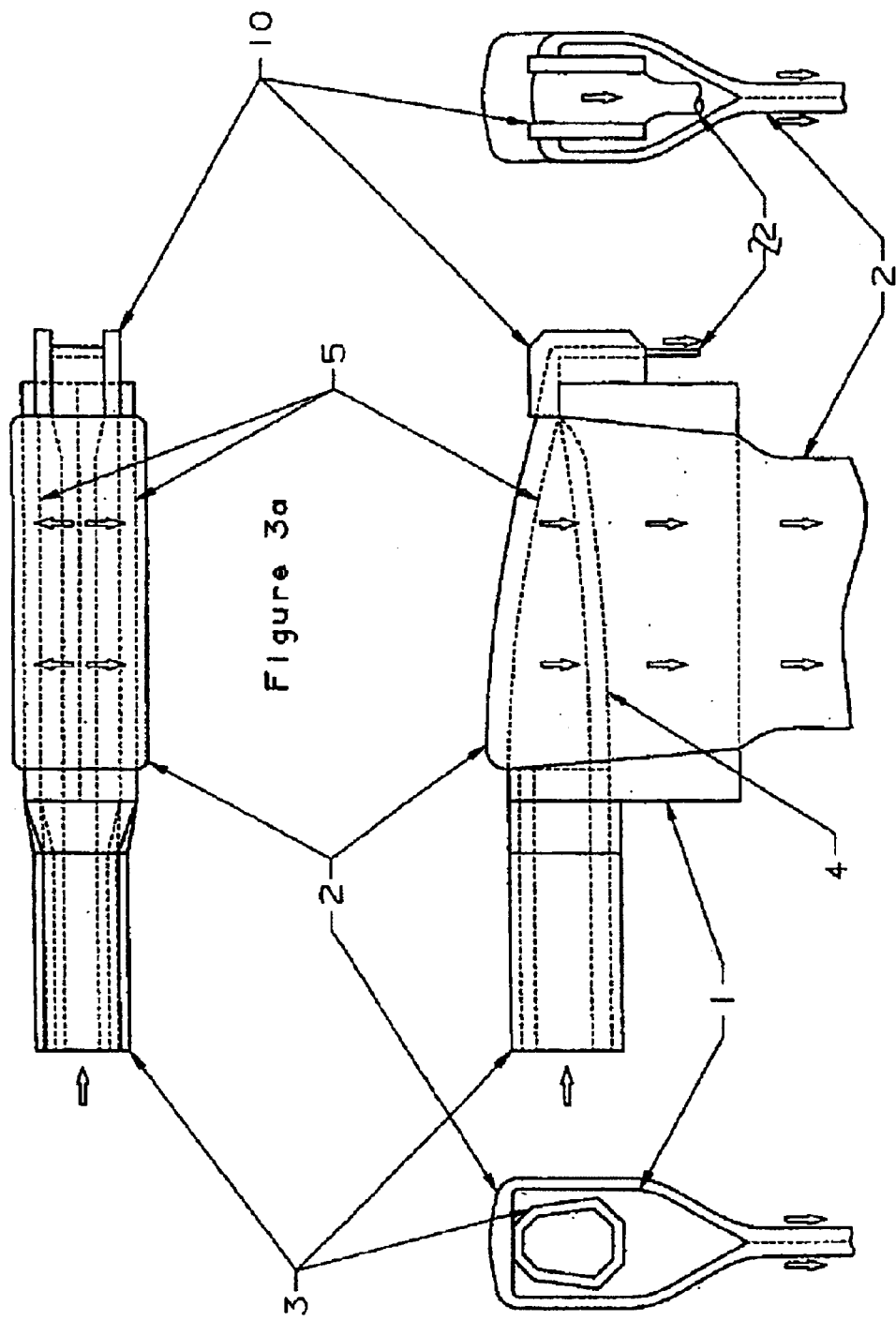

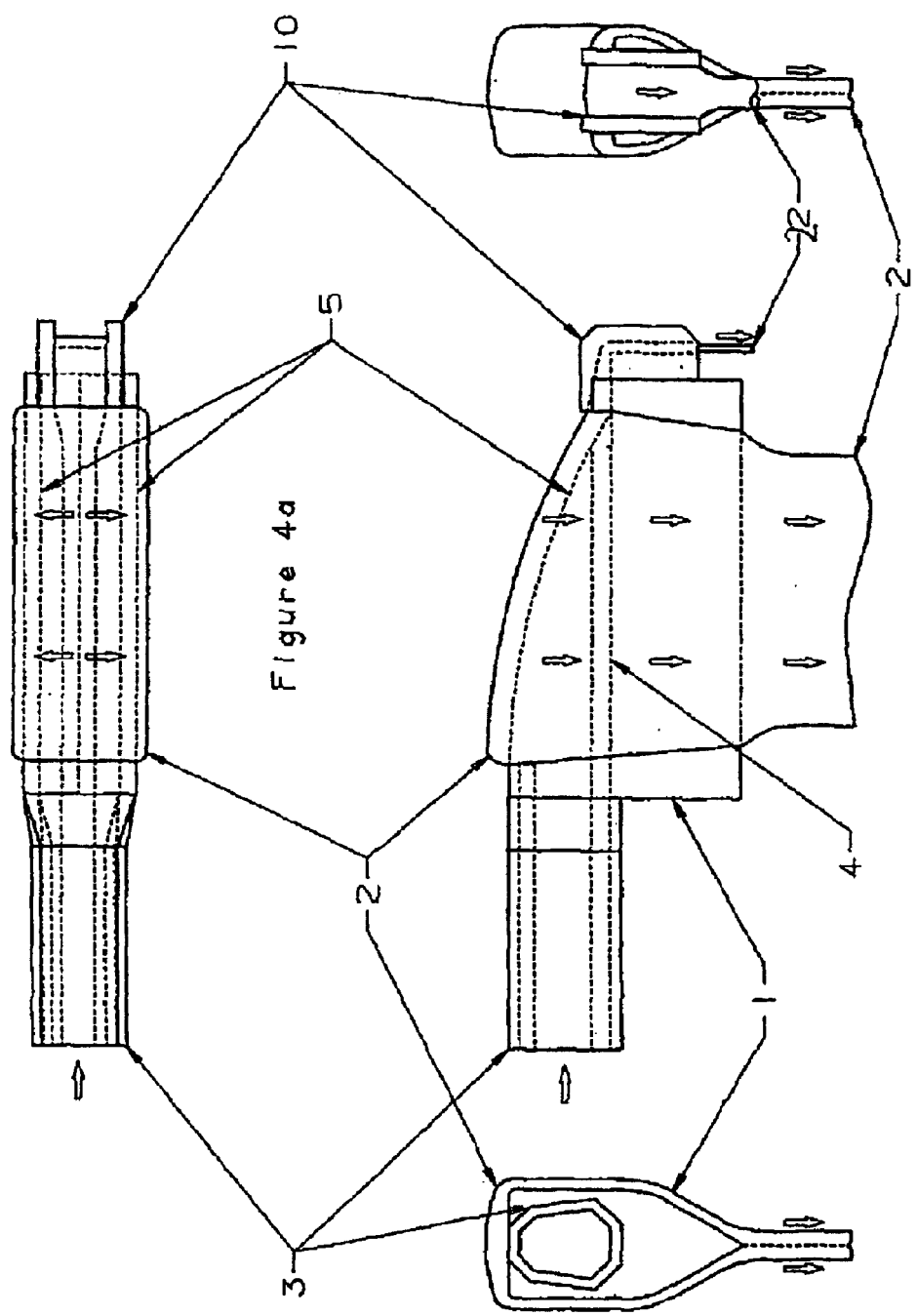

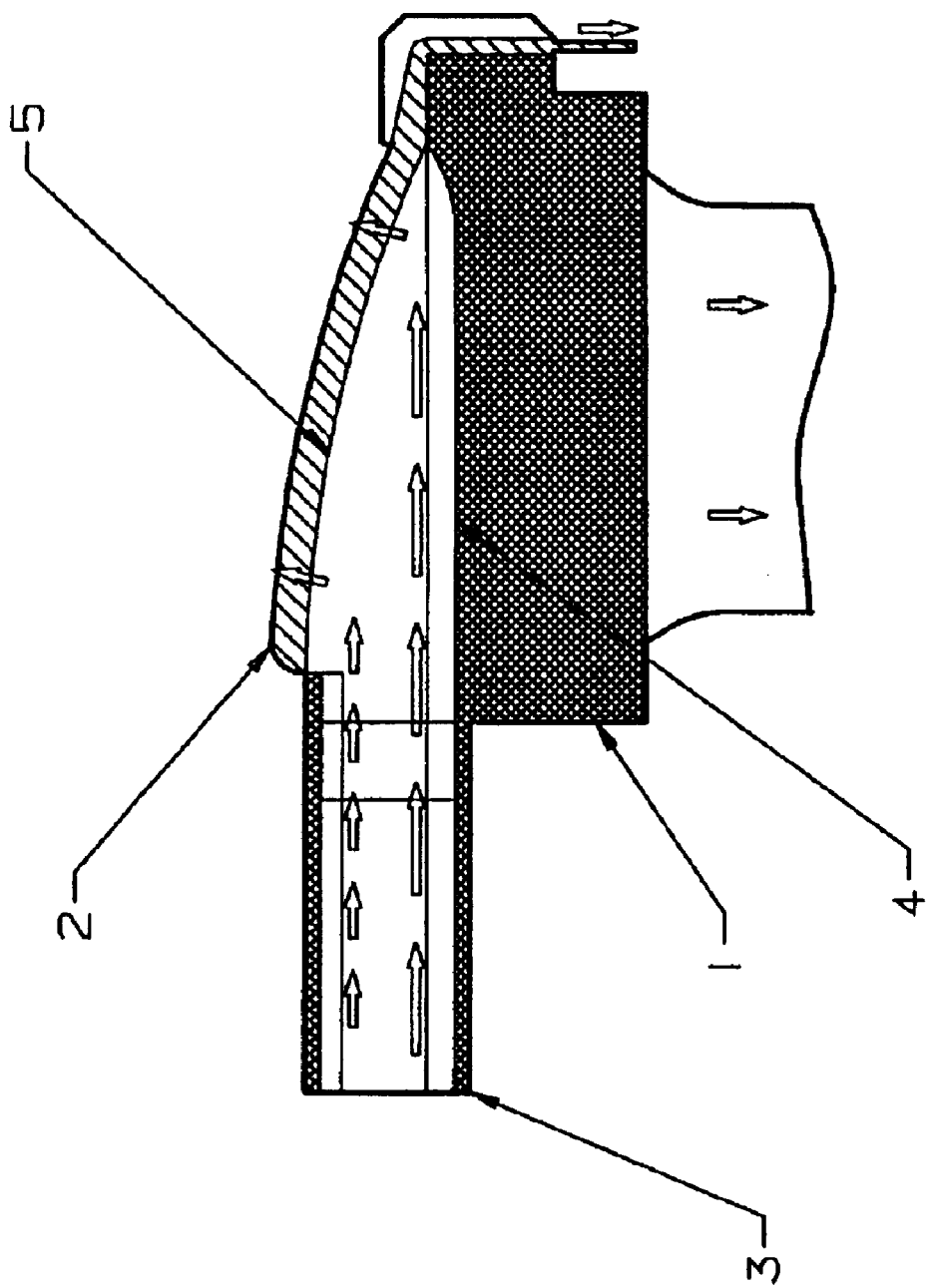

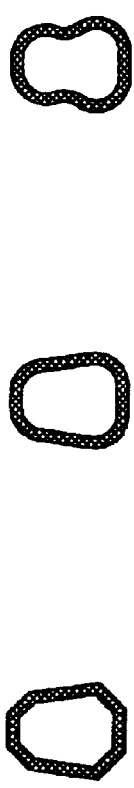
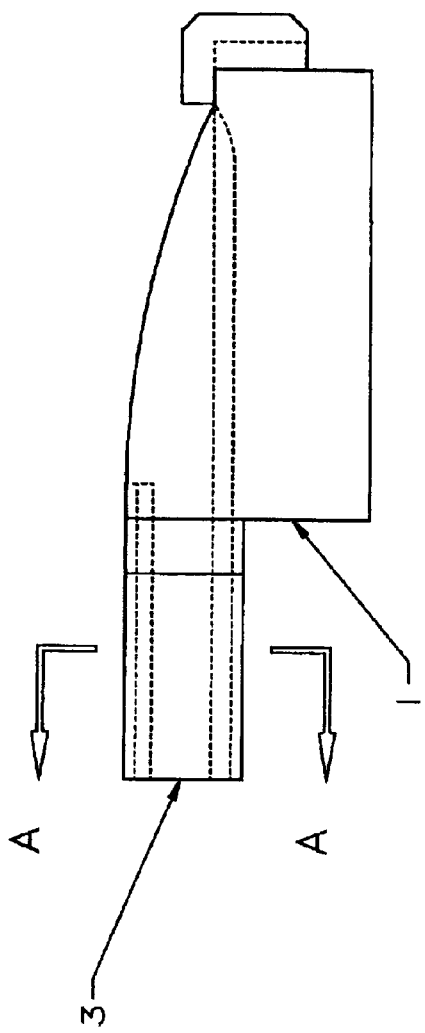
Section A-A  Section A-A  Section A-A
Figure 6a  Figure 6b  Figure 6c
Figure 6d

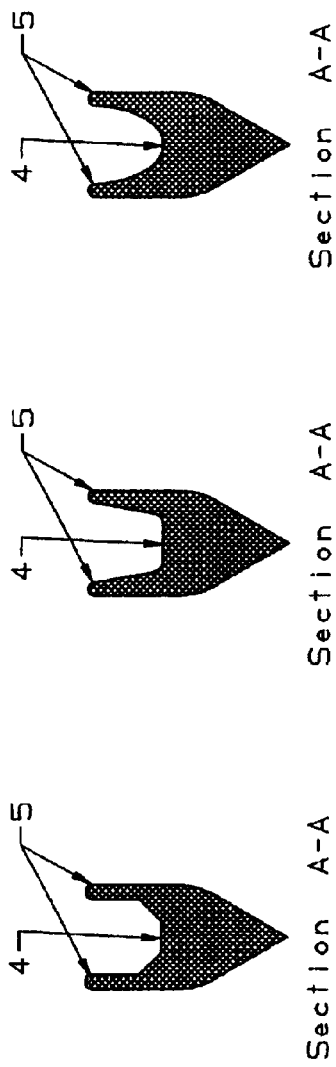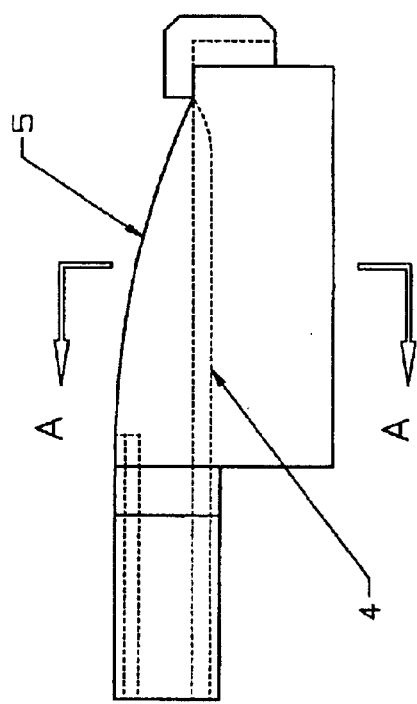
Figure 7a, Figure 7b, Figure 7c, Figure 7d

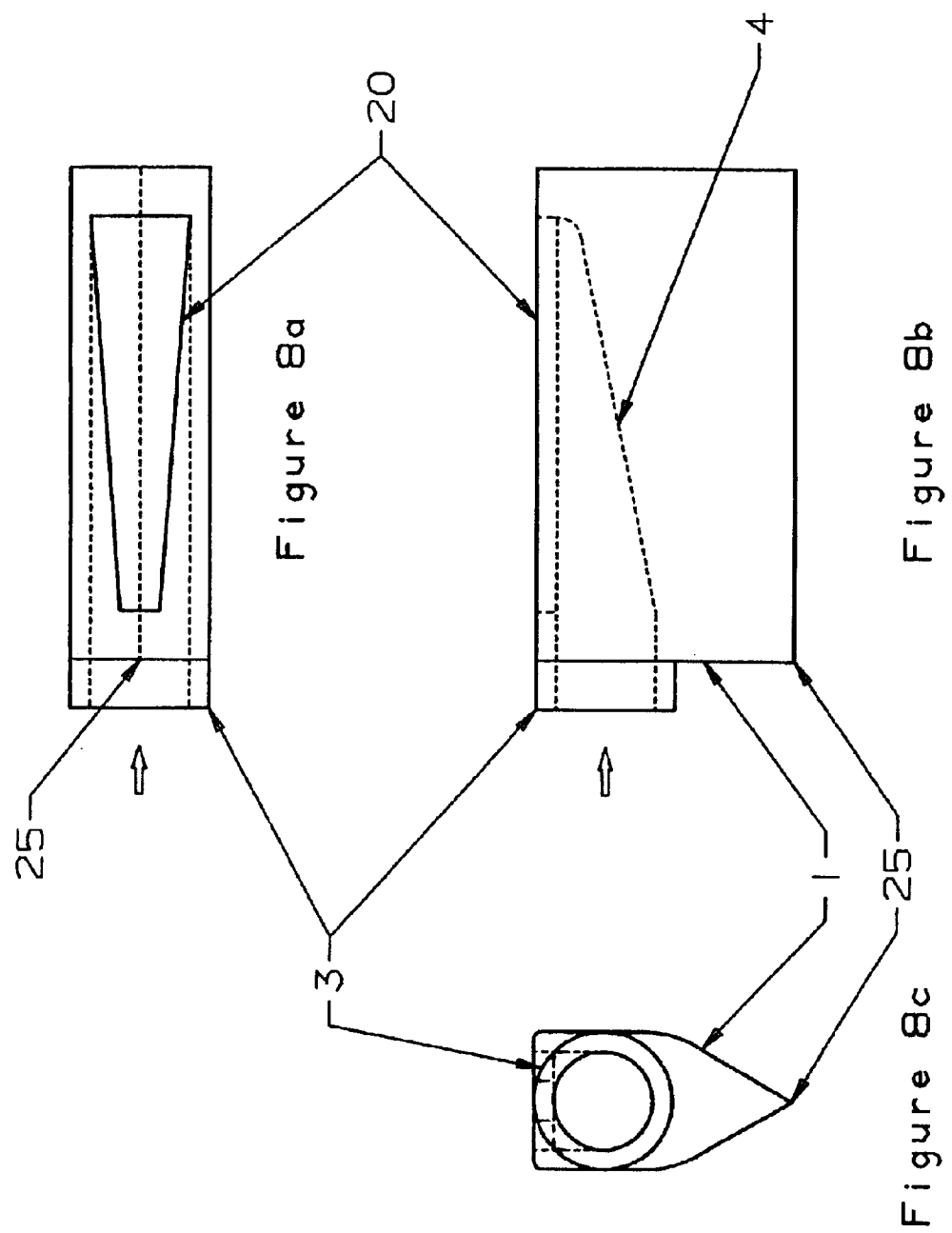

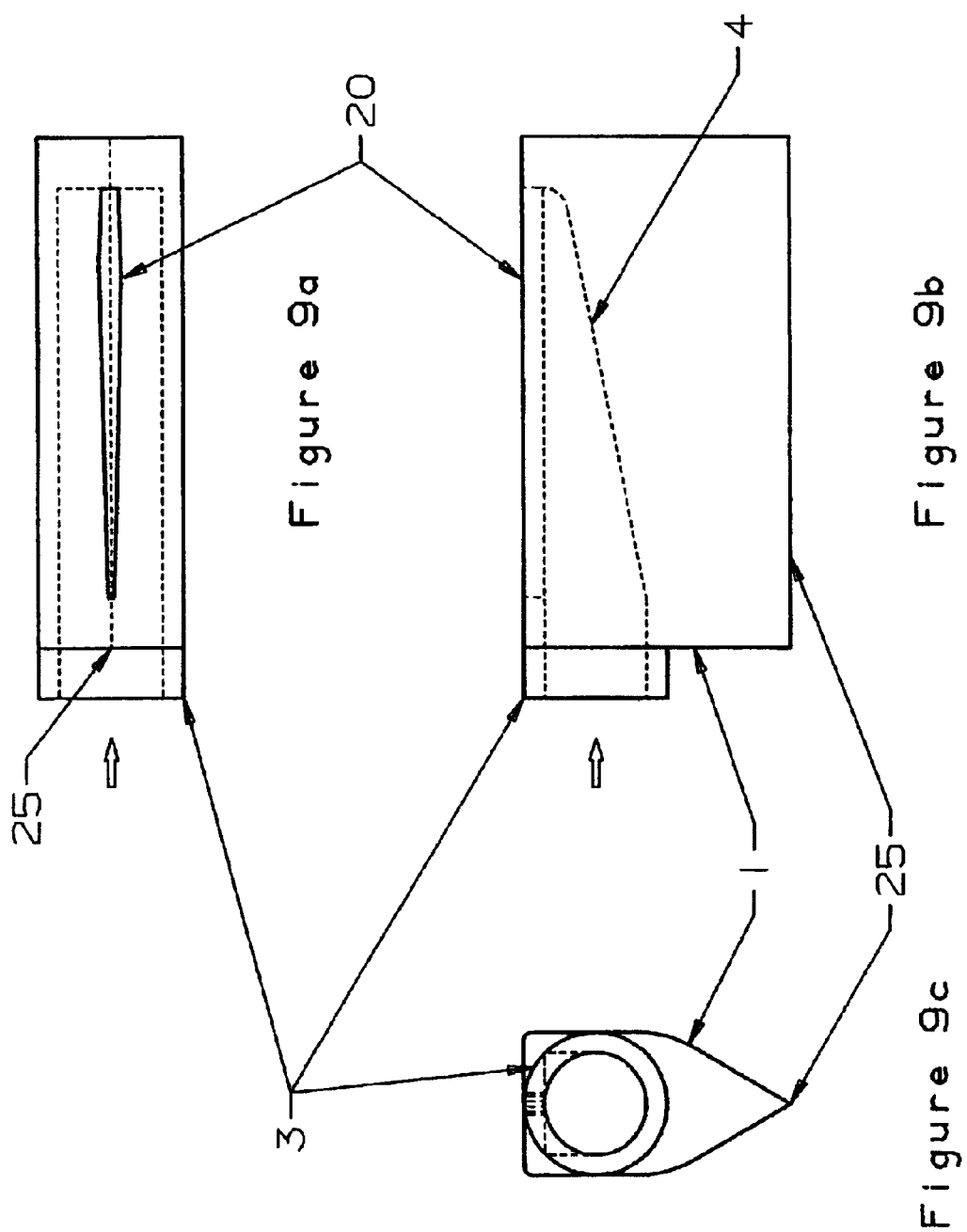

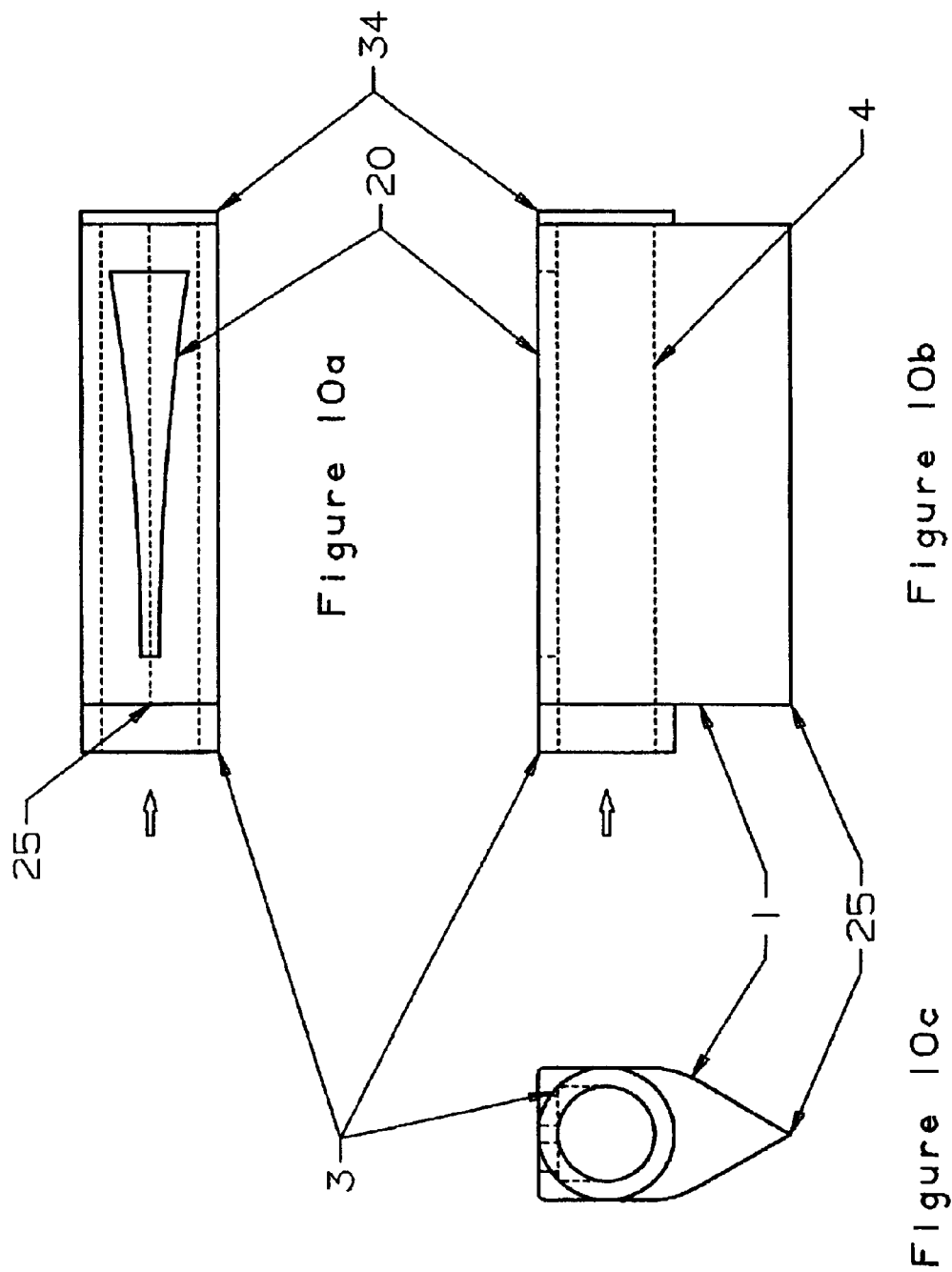

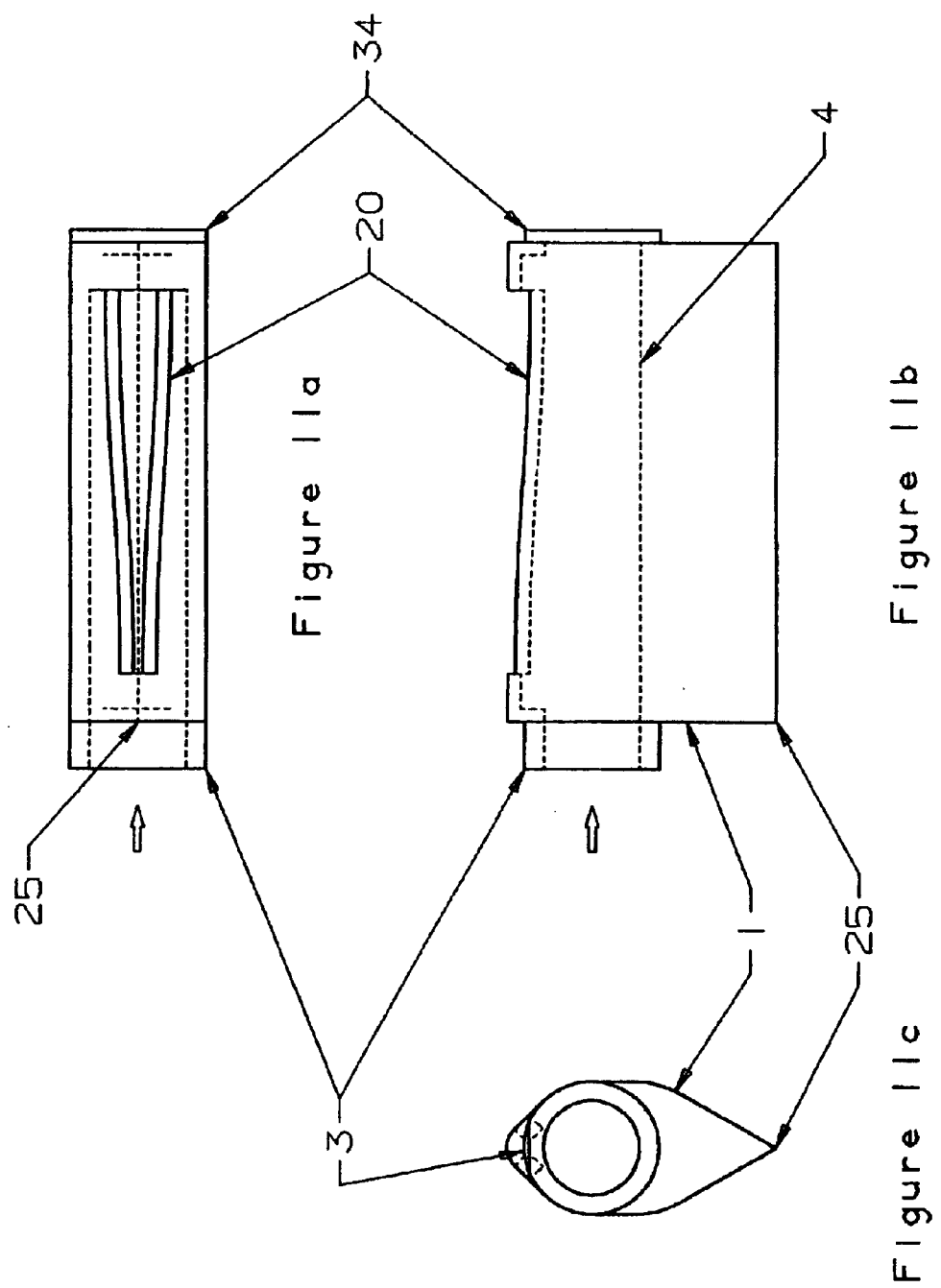

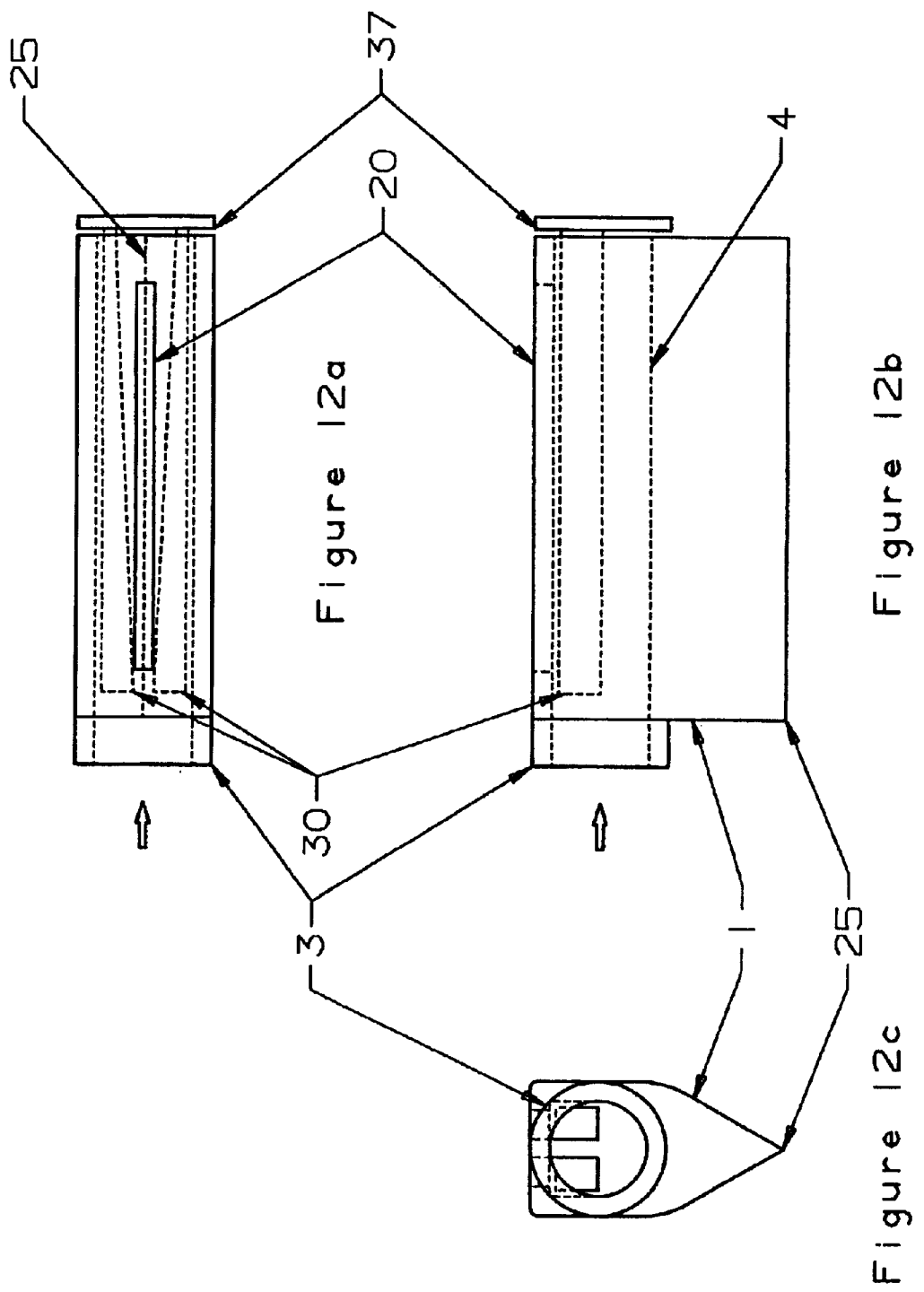

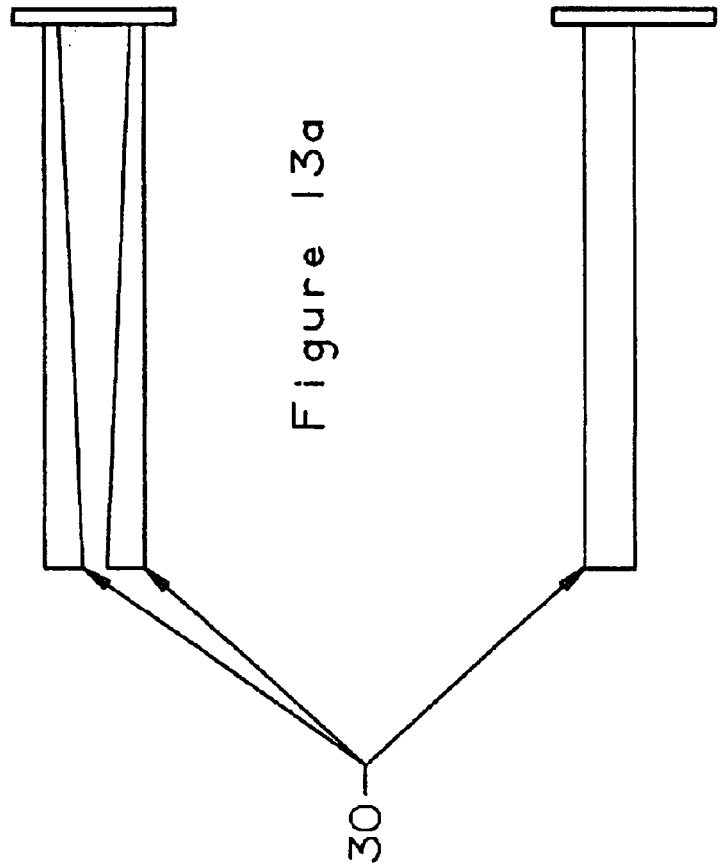
Figure 13a
Figure 13b
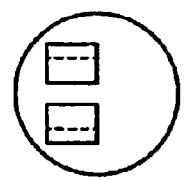
Figure 13c'

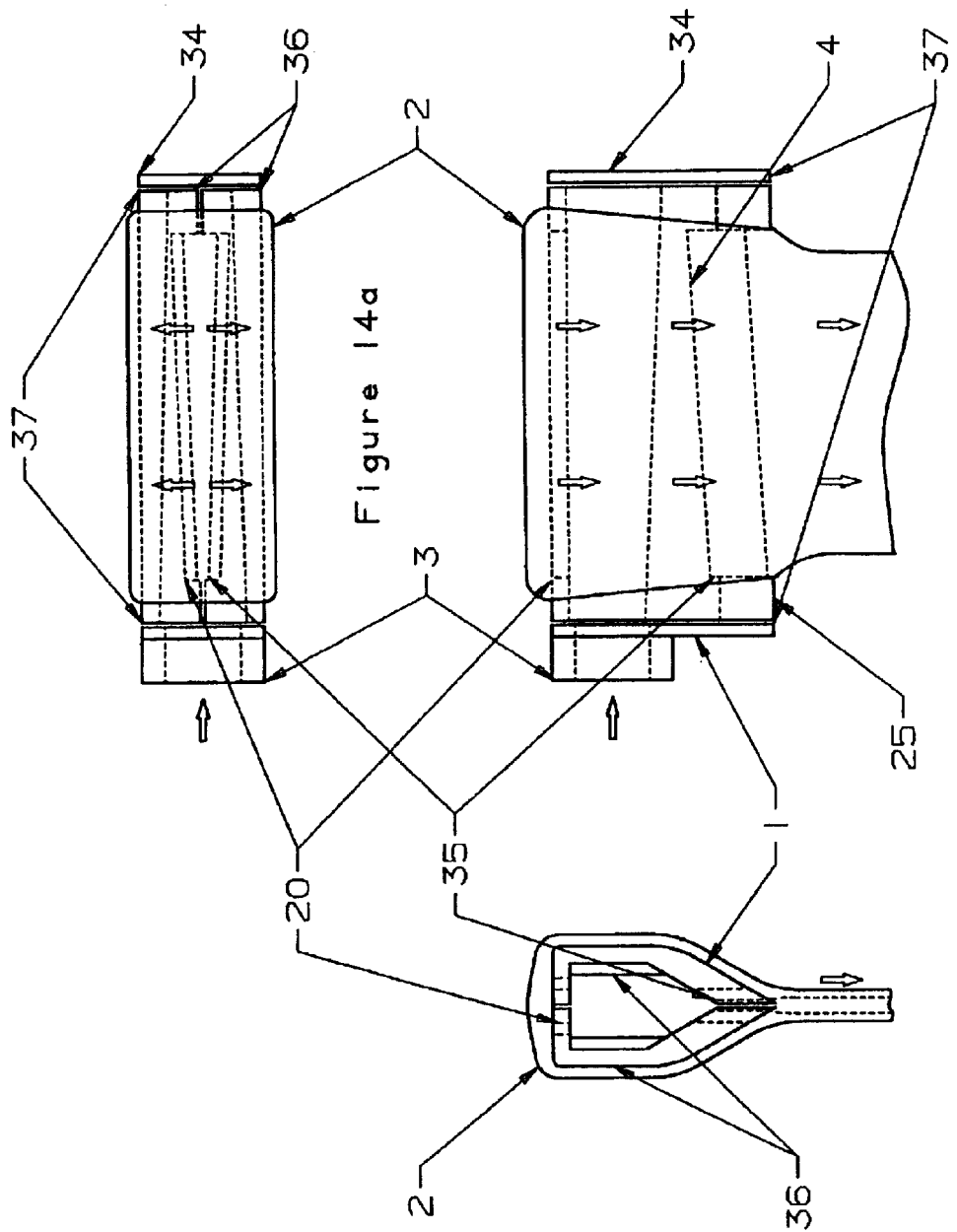

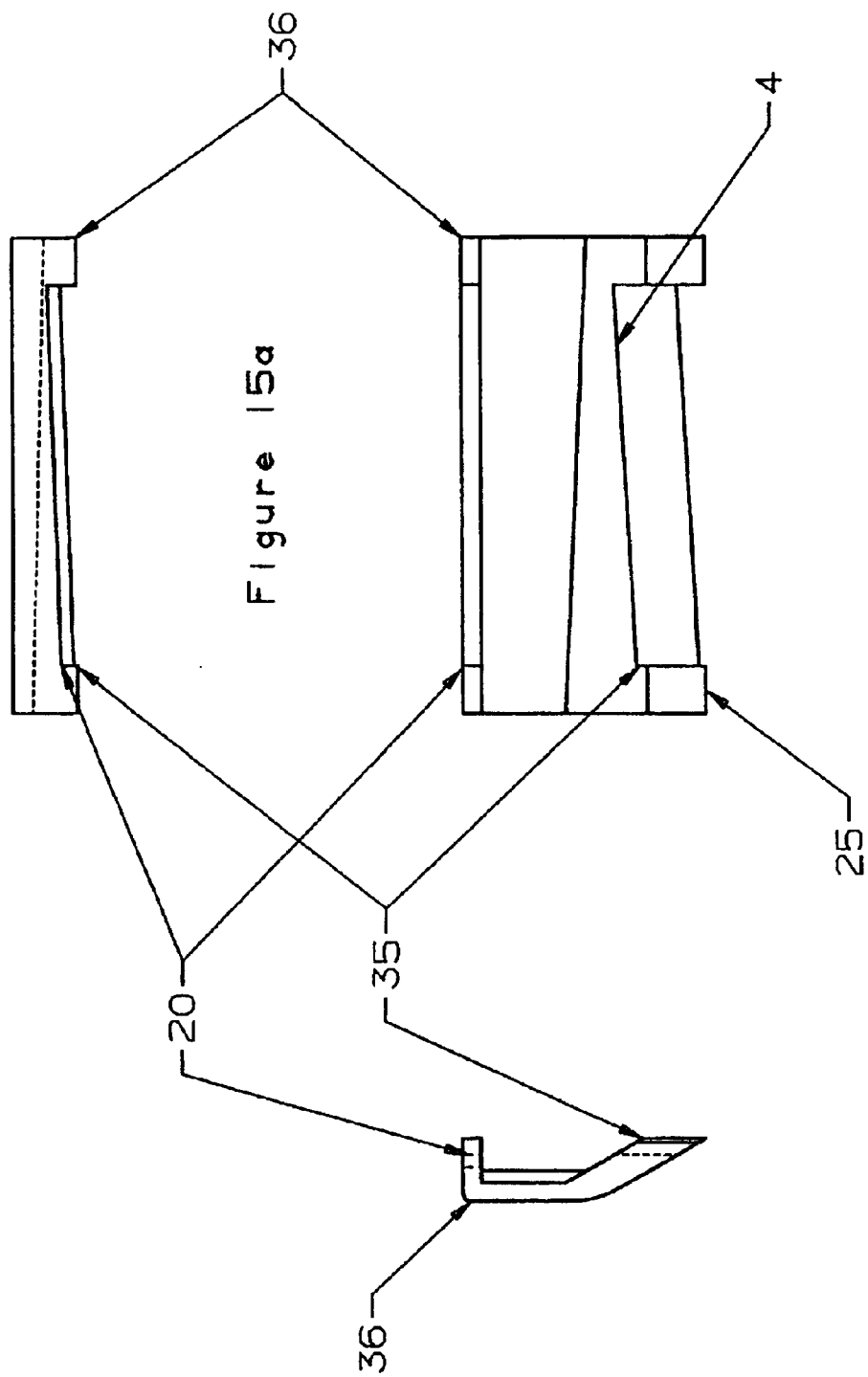

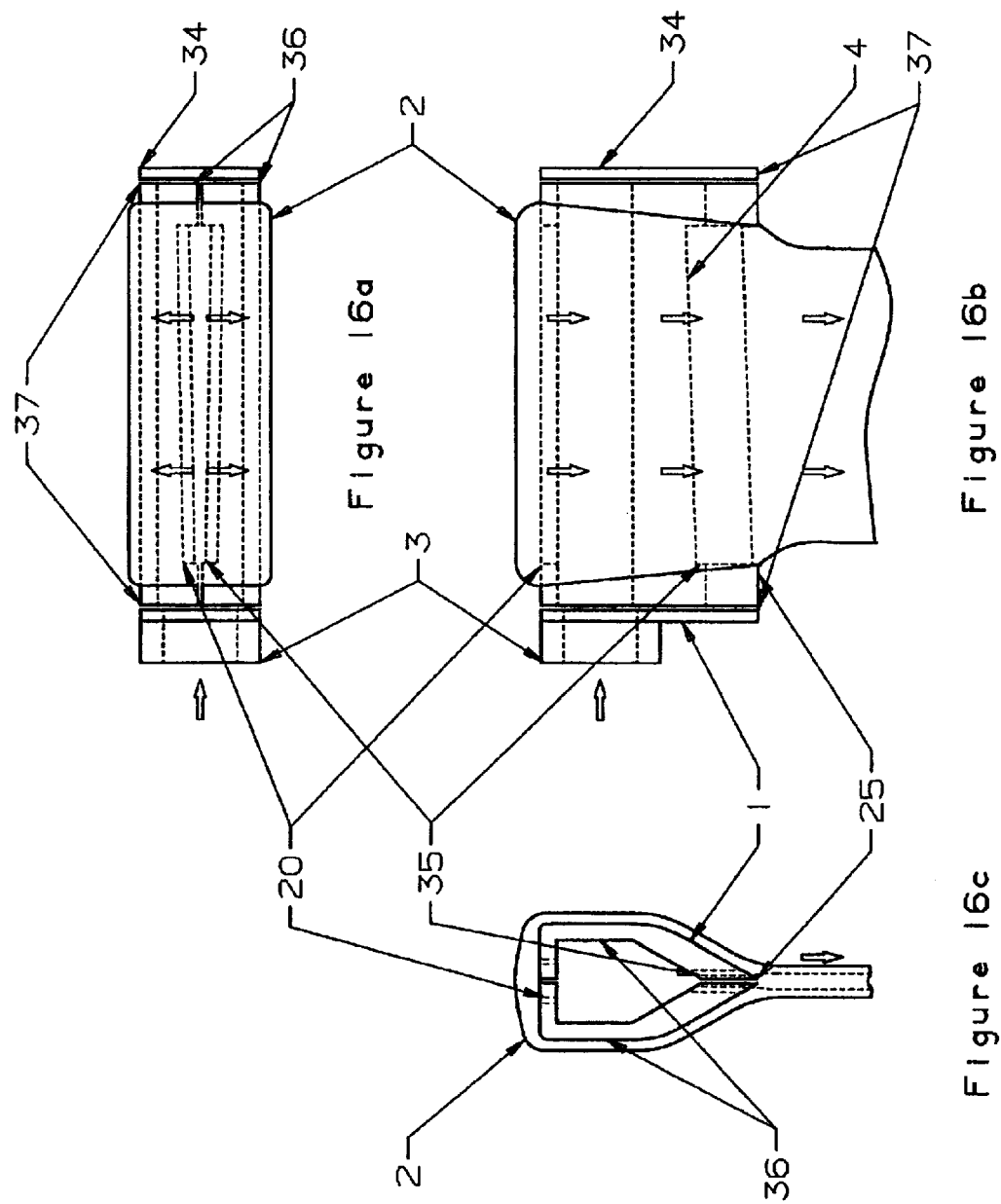

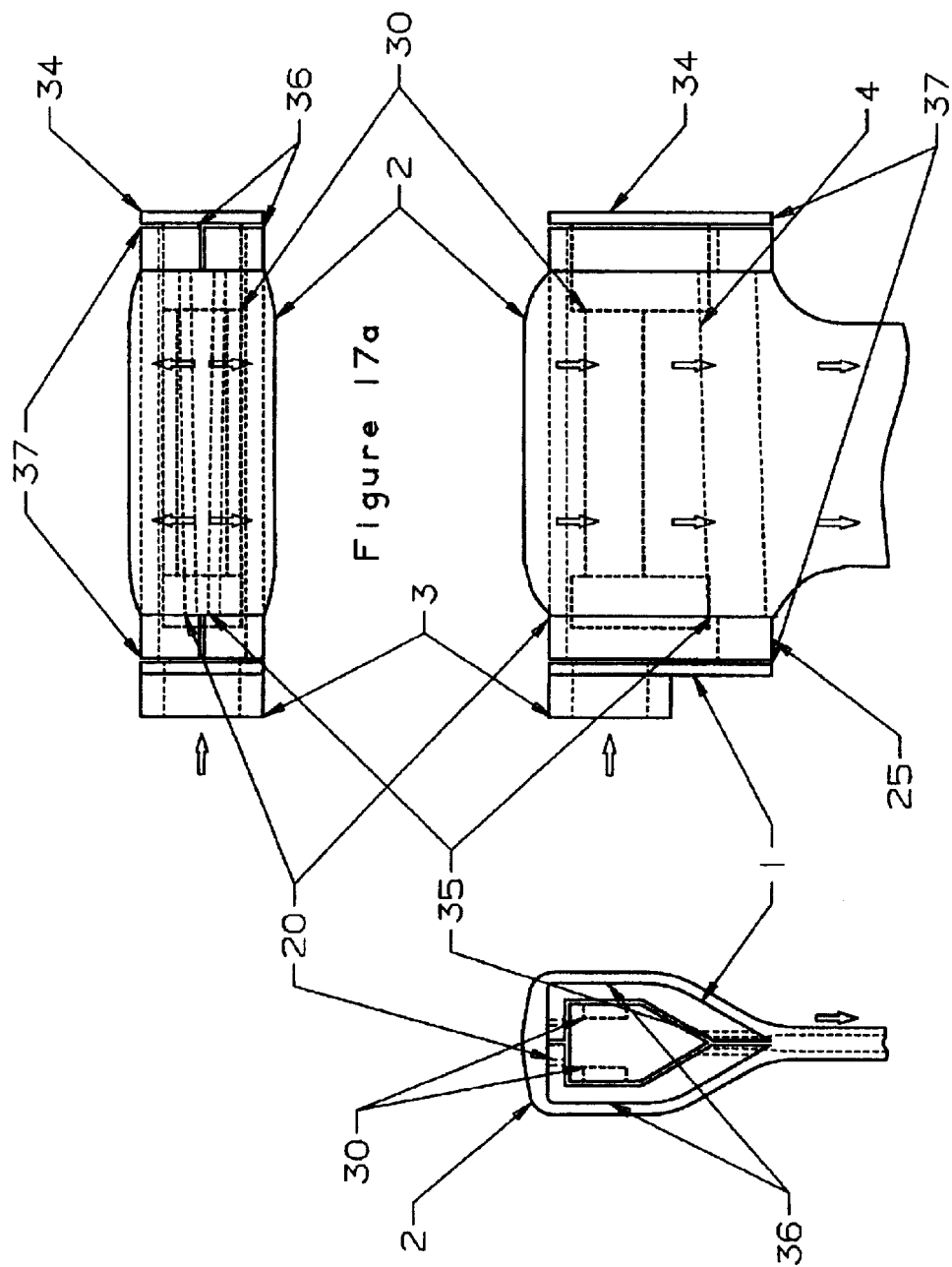

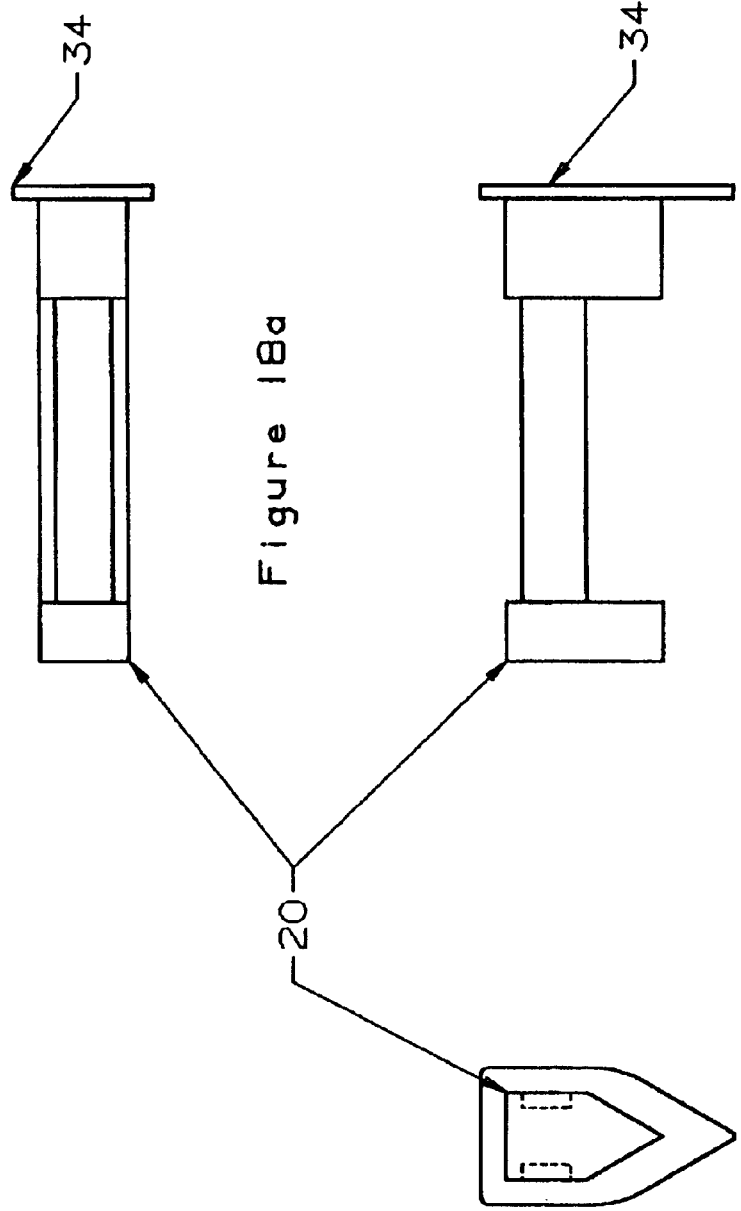

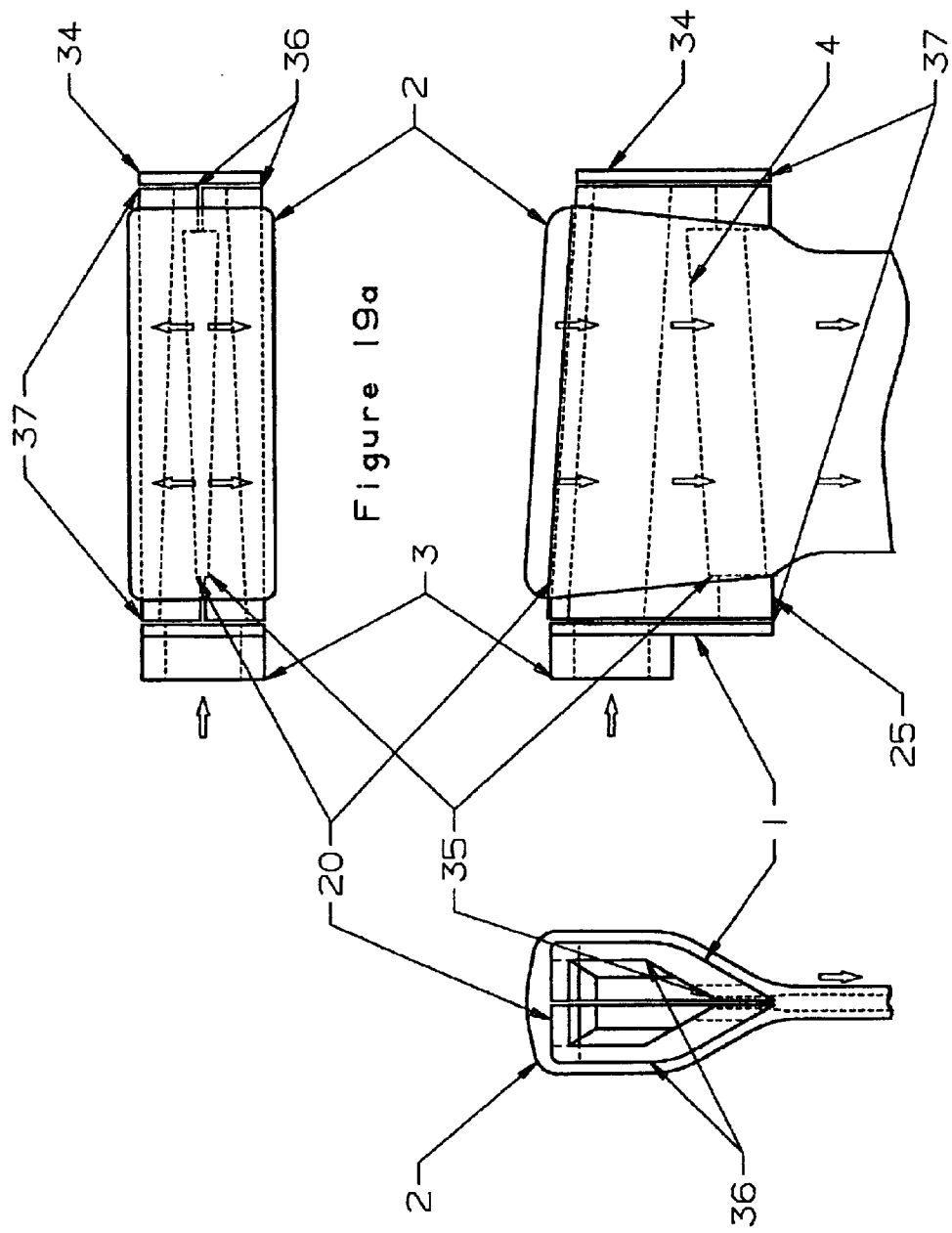

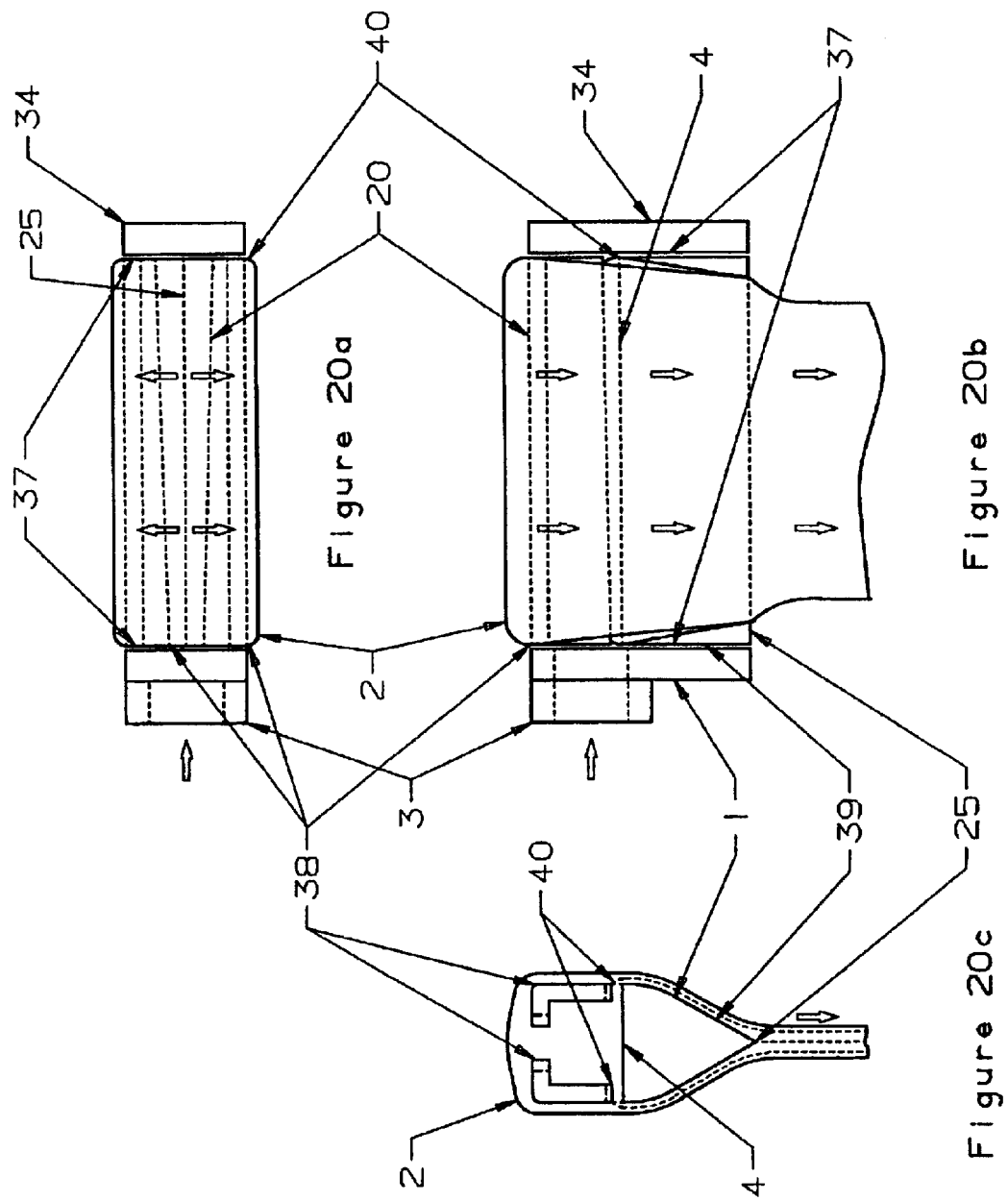

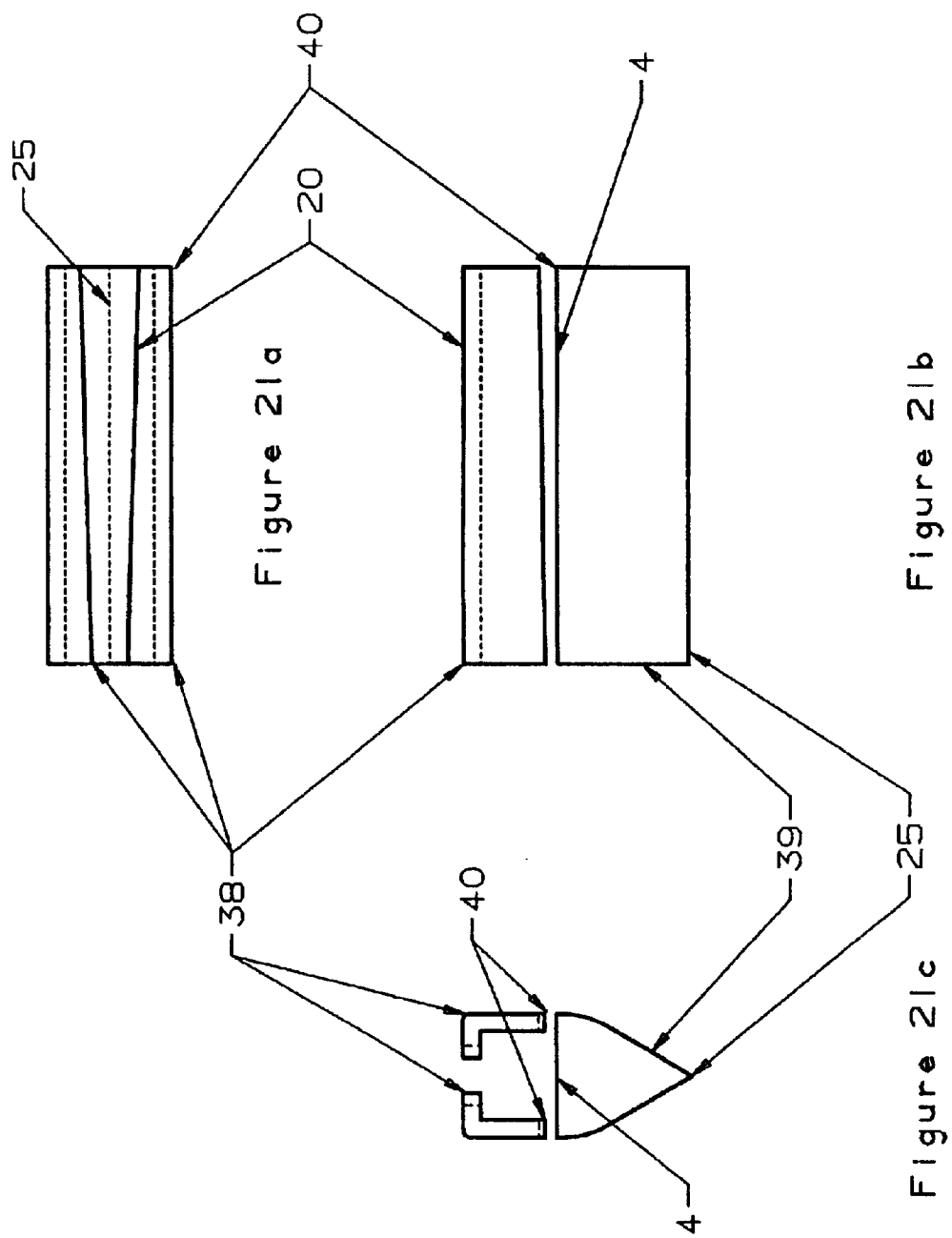

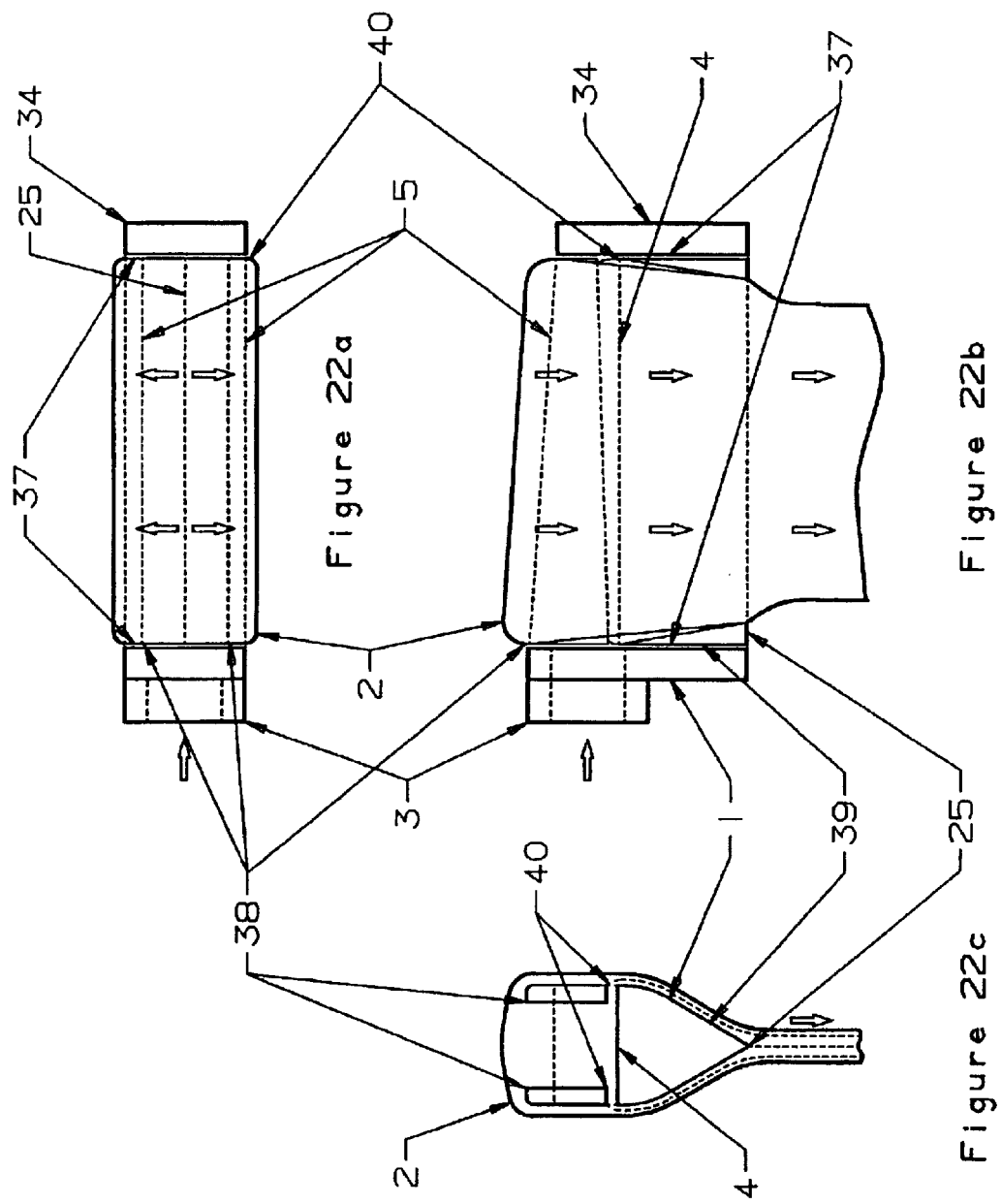

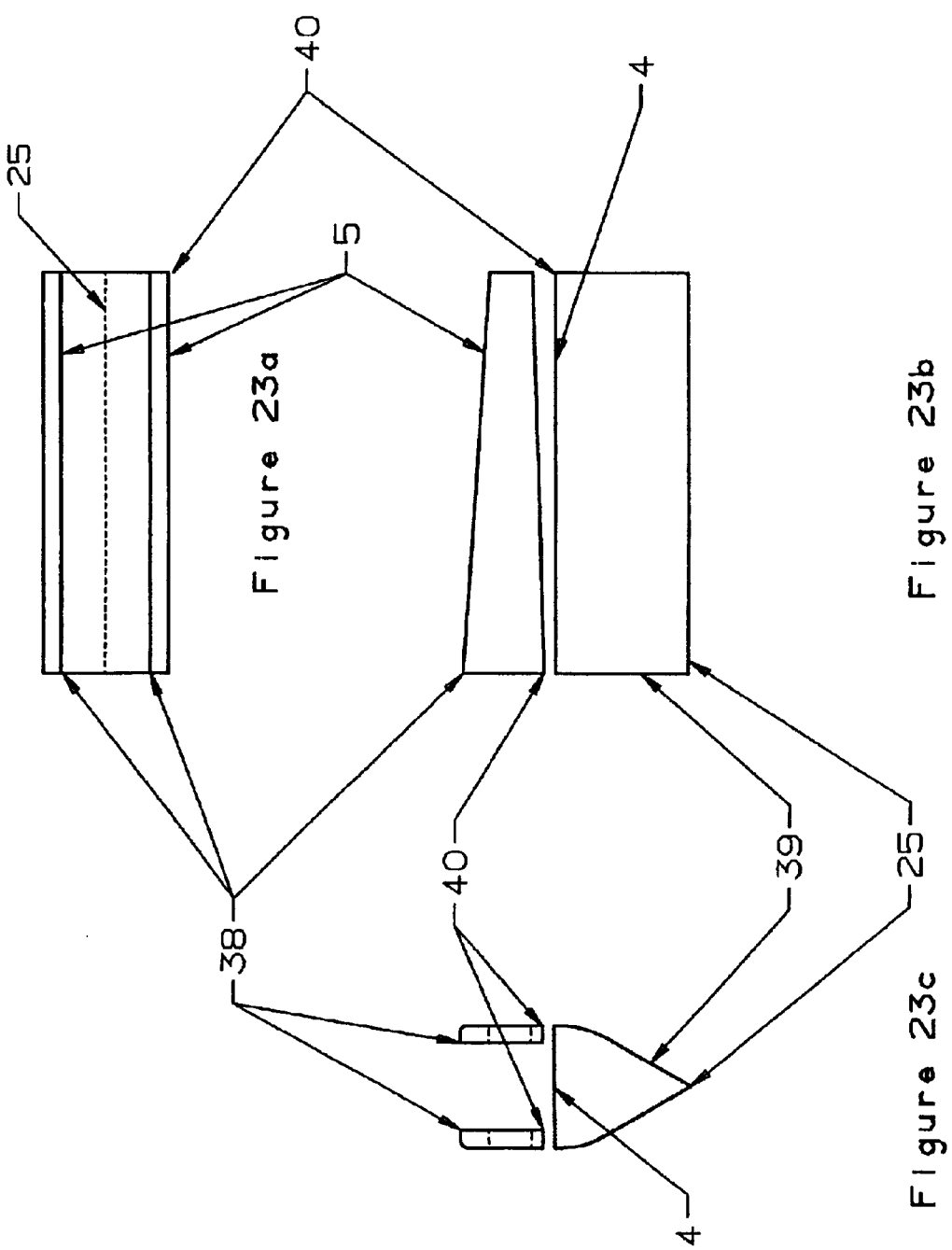

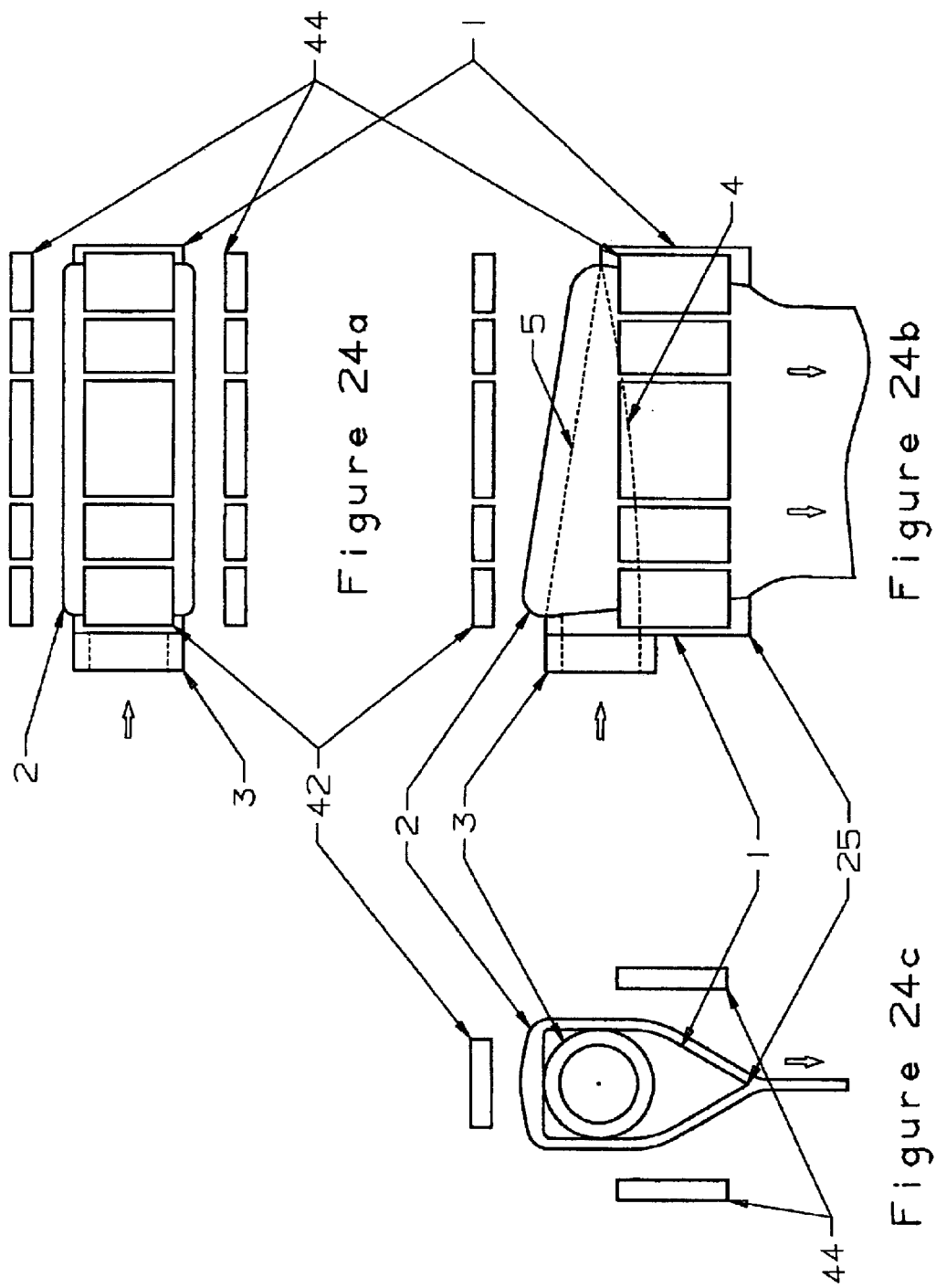

OVERFLOW DOWNDRAW GLASS FORMING METHOD AND APPARATUS

REFERENCE TO RELATED APPLICATIONS

This application claims an invention that was disclosed in one of the following provisional applications:

1) Provisional Application No. 60/202,581, filed May 9, 2000, entitled "SHEET GLASS FORMING DEVICE";
2) Provisional Application No. 60/205,347, filed May 18, 2000, entitled "SHEET GLASS FORMING DEVICE";
3) Provisional Application No. 60/206,904, filed May 25, 2000, entitled "SHEET GLASS FORMING APPARATUS";
4) Provisional Application No. 60/219,902, filed Jul. 21, 2000, entitled "SHEET GLASS FORMING APPARATUS";
5) Provisional Application No. 60/227,696, filed Aug. 24, 2000, entitled "SHEET GLASS FORMING APPARATUS"; and
6) Provisional Application No. 60/245,875, filed Nov. 4, 2000, entitled "SHEET GLASS FORMING APPARATUS".

The benefit under 35 USC §119(e) of the U.S. provisional applications is hereby claimed, and the aforementioned applications are hereby incorporated herein by reference.

BACKGROUND OF THE INVENTION

1. Field of the Invention

The invention pertains generally to the manufacture of glass sheet, and, more particularly to glass sheet formed from an overflow process.

2. Description of Related Art

This invention relates to the manufacture of glass sheet that is currently used for the production of TFT/LCD display devices that are widely used for computers now and are expected to be used for television sets in the future.

The glass that is used for these semiconductor powered display applications must have very high surface quality to allow the successful application of semiconductor type material. Sheet glass made using the apparatus of U.S. Pat. No. 3,338,696, incorporated herein by reference, makes the highest quality glass as formed and does not require post-processing. The patent teaches a manufacturing process termed: "the overflow process". The key feature of the overflow process is that the glass moves through the glass forming equipment and the untouched, "virgin glass", overflows and becomes the outside surface of the glass. Glass made using other processes requires grinding and/or polishing and thus does not have as fine a surface finish.

The teachings of U.S. Pat. No. 3,338,696 are still the state of the art as practiced today, however, the apparatus has limitations.

A major drawback of the present overflow process is the limited range of production rates that can be accommodated by a given apparatus. Simple mathematics teaches that the mathematical product of glass flow, glass viscosity, and the tangent of the tilt angle must be a constant to make glass of uniform thickness for a given apparatus. In practice the angle of tilt has practical limitations and the simple mathematical assumptions fail because of non-linearity, thus the limited range of production rate.

There is also no adjustment provision for curvature or other non-uniformity in the thickness of the glass sheet. During a manufacturing campaign the forming apparatus is subject to changes in shape caused by material erosion and by thermal creep of the material from which the apparatus is constructed. This produces non-uniform sheet thickness for which there is no corrective adjustment.

In practice, glass forming processes are intended to be run for years if possible. Stopping the line may take a month and re-starting another month. The whole system is run at extreme temperature, so the materials used are under constant stress and often wear or need to be adjusted. Stopping the production to make these adjustments or repairs is a highly undesirable option.

The apparatus of "The Overflow Process" makes excellent glass during stable operating conditions, but it recovers from transient conditions very slowly. This is because the flow of glass through the forming apparatus is quite non-uniform. The glass that flows into the apparatus and forms the inflow end of the sheet has a different time history than the glass forming the far end of the sheet. Because the glass flow is from one end to the other, on the order of 10 percent of the glass on the far end of the sheet is at least one hour older than the equivalent glass on the near end. An additional time differential is caused by the rectangular cross-section of the trough which has regions of glass where the flow velocity is very slow.

Another drawback of the apparatus shown in U.S. Pat. No. 3,338,696 is that its physical size becomes larger as production rate is increased. Apparatus durability often requires that parts of the device are made from or coated with refractory metal, i.e. platinum. Thus increasing the size of the system substantially raises the cost of the manufacturing apparatus. The weir overflow process apparatus becomes large as production rates increase because the flow of glass in the trough, channeling glass to the overflow weirs, relies on gravitational flow. As the glass flow rate increases, either the trough must be larger, the slope of the weirs steeper, or the glass viscosity lower to accommodate this increased glass flow. Therefore, the range of production rates that can be accommodated by a given size apparatus is limited.

Another drawback is that the apparatus can only make glass sheet of a fixed width.

SUMMARY OF THE INVENTION

The present invention includes design features that can be used alone or in combination to facilitate faster, more uniform flow of glass through the apparatus and allows the thickness of the sheet to be adjusted.

An overflow device is provided at the far end of the trough and is used in conjunction with tilting of the apparatus to expand the range of glass flow rate and glass viscosity for which this invention will produce satisfactory product. The overflow device may be used in conjunction with tilting of the apparatus, changes in glass flow rate, and changes in glass viscosity (temperature) to regulate the thickness profile of the sheet. In addition, the forming apparatus can be made with non-linear weirs to provide a greater range of flow rates.

The glass flow in the inflow pipe can be modulated to provide more uniform time dependent flow for forming the sheet. Similarly, a contoured trough cross-section is taught which can minimize the quiescent flow regions.

The forming apparatus can include an orifice on top of the trough and glass can be moved through the apparatus using pressure. The orifice is narrow at the inlet end and wider at the far end to accommodate for the loss in static pressure of the glass as it flows to that end.

A forming apparatus can be provided with additional orifices on the bottom or sides to allow greater variability in sheet thickness. Effectively, an additional orifice adds glass to the middle of the formed sheet.

Irregularities in the thickness of the formed glass sheet may be corrected by selective heating of the glass in the trough, heating the weirs or orifice. This requires selective heating of the glass flowing down the outside of the apparatus to restore temperature uniformity at the bottom of the apparatus where the sheet is formed.

A flow control plug can be inserted into the trough, such that flow dynamics can be altered during hot operation by insertion, removal or position adjustment of the flow control plug.

BRIEF DESCRIPTION OF THE DRAWING

FIGS. 1a, 1b and 1c show a top, side and an inlet view of a typical overflow glass forming apparatus.

FIGS. 2a, 2b, 2c and 2d show a top, side, end and an inlet view of an embodiment of a forming apparatus that has a trough with straight sloped weirs, a contoured bottom and an overflow device.

FIGS. 3a, 3b, 3c and 3d show a top, side, end and an inlet view of an embodiment of a forming apparatus that has a trough with contoured weirs and a contoured bottom.

FIGS. 4a, 4b, 4c and 4d show a top, side, end and an inlet view of an embodiment of a forming apparatus that has a trough with contoured weirs and a flat bottom.

FIG. 5 is an illustration of the velocity distribution of the glass flow through the inflow pipe and the trough of the forming apparatus.

FIGS. 6a, 6b and 6c are illustrations of cross-sections of the inflow pipe of the forming apparatus through the section shown in FIG. 6d.

FIGS. 7a, 7b and 7c are illustrations of cross-sections of the trough of the forming apparatus through the section shown in FIG. 7d.

FIGS. 8a, 8b and 8c show a top, side and an inlet view of an embodiment that would be typical of a relatively low inlet pressure.

FIGS. 9a, 9b and 9c show a top, side and an inlet view of an embodiment that would be typical of a relatively high inlet pressure.

FIGS. 10a, 10b and 10c show a top, side and an inlet view of an embodiment that has a simple trough shape and a relatively low inlet pressure.

FIGS. 11a, 11b and 11c show a top, side and an inlet view of an embodiment that has a simple trough, an orifice that is not in a horizontal plane, and a relatively low inlet pressure.

FIGS. 12a, 12b and 12c show a top, side and an inlet view of an embodiment that has a simple trough shape, an internally mounted flow control plug and a relatively high inlet pressure.

FIGS. 13a, 13b and 13c show a top, side and an inlet view of an internal flow control plug.

FIGS. 14a, 14b and 14c show a top, side and an inlet view of an embodiment with a horizontal top orifice, a horizontal bottom orifice, and a shaped trough.

FIGS. 15a, 15b and 15c show a top, side and an inlet view of one of two sides of the apparatus shown in FIGS. 14a–14c, which are in this instance mirror images.

FIGS. 16a, 16b and 16c show a top, side and an inlet view of an embodiment with a horizontal top orifice, a horizontal bottom orifice, and a constant cross section trough.

FIGS. 17a, 17b and 17c show a top, side and an inlet view of an embodiment which is the same as that shown in FIGS. 16a–16c, but with an internal plug which is used to vary sheet width.

FIGS. 18a, 18b and 18c show a top, side and an inlet view of an internal flow control plug used in the embodiment shown in FIGS. 17a–17c.

FIGS. 19a, 19b and 19c show a top, side and an inlet view of an embodiment with a sloped top surface with a weir on each side, a horizontal bottom orifice, and a shaped trough.

FIGS. 20a, 20b and 20c show a top, side and an inlet view of an embodiment where the elements form a horizontal top orifice and two horizontal side orifices.

FIGS. 21a, 21b and 21c show a top, side and an inlet view of the two side elements and the bottom forming wedge of the apparatus shown in FIGS. 20a–20c.

FIGS. 22a, 22b and 22c show a top, side and an inlet view of an embodiment where the elements form a sloped top surface with weirs at each side and two horizontal side orifices.

FIGS. 23a, 23b and 23c show a top, side and an inlet view of the two side elements and the bottom forming wedge of the apparatus shown in FIGS. 22a–22c.

FIGS. 24a–24c show a top, side and an inlet view of an embodiment that has radiant top heating devices and radiant side heating devices.

DETAILED DESCRIPTION OF THE INVENTION

The present invention teaches that faster, more uniform flow of glass can be accomplished in the overflow glass process by modifying the forming apparatus in substantial ways. This process is currently used for making glass sheets that go into TFT/LCD display devices.

The glass must have very high surface quality and sheet glass made using the overflow process has this quality. The overflow process is defined as a process that: 1) moves molten glass into a trough; 2) allows the glass to overflow the sides of the trough; and 3) the glass overflowing each side comes together such that the outside surface of the glass sheet is formed from glass that has not touched the surface of the glass forming equipment (post mixing). This untouched, "virgin glass", forms an extremely uniform and clean outside surface of the glass sheet. Any modifications to the process or apparatus must provide this high quality glass surface.

The flow dynamics in all embodiments of this invention are such that the outside surfaces of the glass sheet are formed from thoroughly mixed virgin glass that comes from the center of the glass stream flowing into the forming apparatus and thus has not contacted a refractory or refractory metal surface. This produces the highest possible surface quality. This pristine surface is essential for the manufacture of LCD/TFT semiconductor display devices.

The glass flow into this apparatus from a stirring device or alternately from a forehearth bowl must be thoroughly mixed to eliminate cord and insure homogenous glass. A suitable overflow chamber may be required to insure that the glass flowing to the process is of the most uniform quality. Stirring and overflow chambers are satisfactorily understood glass manufacturing technology to those of skill in the art and the various possible designs are not specifically disclosed.

Referring to FIGS. 1a, 1b and 1c, an overflow glass sheet forming apparatus is shown. The cross-sectional view of FIG. 1c shows that the forming apparatus body (1) resembles an elongated wedge with the glass sheet being formed at the downward facing point of the wedge, called the root (25). Molten glass (2) enters an inflow pipe (3) that conducts the glass (2) to a trough (4) on the top of the forming apparatus (1). The glass (2) entering the forming apparatus (1) should be uniformly heated to a molten state and experience laminar flow as it moves through the inflow pipe (3) after mixing. From the inflow pipe (3) the glass (2) enters the trough (4) of the forming apparatus (1), flowing substantially parallel to the root (25) in a substantially horizontal direction. The trough (4) distributes the glass (2) to two substantially parallel weirs (5) located on the top edge of the apparatus (1). The weirs (5) which are on each side of the top of the apparatus (1) form the sides of the trough (4) and are aligned with the pointed edge of the wedge. The major portion of the glass (2) flows over the top of weirs (5) on each side of the trough (4) and down the sloped sides of the wedge, joining at the root (25) to form a flat sheet of molten glass (2). The distribution of flow out of the horizontal trough (4) and onto the sides of the forming apparatus (1) is controlled by the contoured shape of the bottom and sides of the trough (4) and the shape and height of the weirs (5) on each side of the top of the apparatus (1). The molten glass (2) is subsequently cooled until it is a solid sheet.

The flow must be compensated at each end of the forming apparatus (1) to account for end effects caused by surface tension. This compensation requires a localized adjustment in the shape of the weirs (5) and/or the shape of the trough (4) bottom. Surface tension affects the flow down the sides of the forming apparatus (1) and the flow in the free space below the forming apparatus (1) before the molten glass (2) has cooled to a solid form. Devices similar to the "Sheet Glass Edge Control Device" of U.S. Pat. No. 3,451,798, incorporated herein by reference, may be employed on all embodiments but are not shown in the figures.

Once the glass sheet is formed it is processed with known equipment for handling the glass sheet. It is essentially, "drawn down" from the bottom of the sheet forming apparatus (1). In general, the edges of the sheet are trimmed, so most handling, if not all, is done by machine touching just the edges. In addition, the equipment will prevent rapid temperature fluctuation to avoid degrading the quality of the glass. Such equipment is well known in the art and is not discussed in detail here. This invention is directed specifically to the overflow glass forming apparatus (1).

In all embodiments of this sheet forming apparatus, accurate and robust construction of the orifice is essential for the required uniform flow distribution over the duration of a production run. There are two material systems from which the apparatus may be fabricated: molybdenum or refractory, i.e. alumina. The refractory option is presently used by the Overflow Process. For the refractory option, when high durability is required, the orifices would be made from refractory metal, i.e. platinum, reinforced as required by refractory, i.e. alumina. The orifices may be either sprayed, via a molten platinum spraying process, directly on shaped alumina body or fabricated from sheet. The entire apparatus may be clad in a refractory metal envelope if maximum durability is required. The use of molybdenum is an option for the construction of the apparatus (1) because of the smaller size of the apparatus. Each of the side flow control elements and perhaps even the forming wedge element would be made of molybdenum. Molybdenum must be protected from oxidation when it is used at glass forming temperatures. This is accomplished by either covering the molybdenum with platinum, coating the glass contact areas with glass prior to high temperature exposure to oxygen, or surrounding the apparatus with a controlled non-oxidizing atmosphere.

The present invention teaches that the glass forming apparatus (1) can be designed to avoid many of the problems associated with the previous designs for the overflow trough (4). The apparatus and process of the present invention allows a degree of adjustment that has been previously unknown to this process. Many of the parts are designed to be adjusted or exchanged while the glass is hot. The output of glass sheet is interrupted for a brief period, but the production line continues such that the months of delay for shut down and start-up are avoided. In addition, novel features are provided that allow the system to run under pressure to increase glass flow.

Overflow Device

Referring to FIGS. 2a, 2b, 2c and 2d, the present invention provides a forming apparatus (1) that can be used to make substantially constant thickness glass (2) over an expended range of values of the mathematical product of glass flow and glass viscosity by using a combination of the tilt of the apparatus (1) with a change in glass flow through an overflow device (10) at the far end of the apparatus (1).

The forming apparatus shown in FIGS. 2a–2d has straight sloped weirs (5) that are close to parallel with the pointed edge of the wedge shaped portion of the forming apparatus (1) but sloped slightly downward in the direction away horn the inflow pipe (3). Glass (2) enters the trough (4) through an inflow pipe (3). The bottom and sides of the trough (4) are contoured in a manner to provide even distribution of glass to the top of each side weir (5). The major portion of the glass (2) then flows over the top of each side weir (5), down each side of the wedge shaped portion of the forming apparatus (1), and joins at the bottom of the wedge to form a sheet of molten glass (2). The molten glass (2) is then cooled to form a solid glass sheet of substantially uniform thickness. A small portion of the glass (22) passes through the forming trough (4) and out the far end through an overflow device (10). The overflow device (10) incorporated at the far end of the trough (4) is used in conjunction with tilting of the apparatus (1), changes in glass flow rate, and changes in glass viscosity to regulate the thickness profile of the sheet.

The sheet glass forming apparatus is designed for constant temperature operation in the region of the forming trough (4) and the weirs (5). The linear sheet thickness differential from one end of the sheet to the other end is called wedge. The nonlinear sheet thickness variations from one end of the sheet to the other end is called curvature. The wedge and curvature are primarily a function of the trough (4) shape and the shape of the weirs (5) on each side of the trough (4). The glass (2) sheet thickness distribution is the same for a given value of the mathematical product of glass flow rate times the glass viscosity. A change in either of these variables independent of the other will produce wedge and/or curvature in the sheet thickness distribution.

Operational adjustment of any wedge or curvature in the sheet thickness may be effected by tilting the apparatus (1) and by varying the portion of glass (22) flowing to the overflow device (10). For instance, if the glass (2) at the far end is thinner than at the inlet end, lowering the far end will flow more glass (2) to that end, consequently thickening the sheet at the far end. Conversely, increasing the portion of glass (22) flowing to the overflow (10) will decrease the glass thickness at the far end of the forming apparatus. Since the two effects are nonlinear, different combinations of tilt and overflow glass can produce corrections in both curvature and in wedge. This will allow for a longer production campaign with a given forming apparatus, thus reducing manufacturing down time with a resultant cost saving.

Non-Linear Weirs

The prior art required the trough (4) to be rectangular and did not contemplate anything other than straight weirs (5). FIGS. 3a–3d show an embodiment that is the same as the embodiment shown in FIGS. 2a–2d except that both of the weirs (5) and the bottom of the trough (4) are contoured such that the flow over the weirs (5) is uniform over their entire length. FIGS. 4a–4d show an embodiment that is the same as the embodiment shown in FIGS. 2a–2d except that trough (4) has a flat bottom and only the weirs (5) are contoured such that the flow over the weirs (5) is uniform over their entire length. The trough (4) bottom is shown horizontal but may be sloped.

The exact shape of the trough (4) and weirs (5) can be calculated by solving the Navier Stokes Equations using any of a number of computational fluid dynamics software packages such as CFD2000™, Fluent™, and Flow 3D™. The criteria for a satisfactory design is to have a substantially even distribution of glass (2) in the longitudinal direction flowing at the desired rate from the root (25) of the apparatus (1). To solve the equations, a spatial grid is constructed to represent the proposed internal geometry of the inflow pipe (3), the trough (4) internal cavity and the shape of the top surface of the weirs (5). The fluid properties are imposed along with boundary conditions to represent the walls, the free surfaces, and the required process glass flow rate. A trial solution is executed and the size and shape of the components are revised until the solution produces a flow distribution at the root (25) of the apparatus (1) that satisfies the design criteria.

In many cases, it will be desirable to keep the size and shape of some components static and vary just one or two components. For example, U.S. Pat. No. 3,338,696 teaches that the top portion of the weirs can be removed and resurfaced if worn, however, as opposed to replacing the weirs with new ones of the same shape, the present invention teaches that the new weirs could have a non-linear shape. In that way numerous flow conditions could be accommodated simply by modifying the shape of the weir and to calculate its shape all other components would be kept static and just the shape of the weir would be varied to develop an optimal solution to the Navier Stokes equations.

Inflow Pipe

One of the objectives of the present invention is to significantly reduce the time difference between the glass forming the near end of the sheet and the far end of the sheet. This can be accomplished by redesigning the inflow pipe (3) to the trough (4) such that the glass (2) that enters the trough (4) and forms the near end is delayed relative to the glass (2) that enters the trough (4), flows the length of the forming trough (4), and forms the far end of the sheet.

FIG. 5 is an illustration of the velocity distribution of the glass flow through the inflow pipe (3) and the trough (4) of the forming apparatus. The length of the arrows in the figure are proportional to the glass flow velocity. The inflow pipe (3) is shaped to be narrower at its top than at its bottom. This causes the flow of glass (2) to be slower at the top of the inflow pipe (3) than at its bottom. The glass flowing through the top of this shaped inflow pipe (3) goes to the near end of the weirs (5) and the glass (2) flowing through the bottom goes to the far end of the weirs (5). Shaping the inflow pipe (3), thus modulating the flow over each end of the weirs (5), minimizes the time difference between the glass (2) that forms the near end of the sheet versus the glass (2) that forms the far end the sheet.

FIGS. 6a, 6b and 6c are illustrations of cross-sections of the inflow pipe (3) of the forming apparatus (1). The cross-section of the inflow pipe (3) is determined by the requirements of the application which would include such considerations as flow modulation, heat losses, and ease of manufacture.

Non-Rectangular Trough Cross-Section

Along the same objectives, it is desirable to reduce the time difference between the glass (2) forming the near end of the sheet and the far end primarily by changing the rectangular cross-section of the trough (4) to reduce the regions of extremely slow glass flow. The glass "Sheet Forming Apparatus" in U.S. Pat. No. 3,338,696 requires a rectangular sheet forming trough cross-section, which inherently produces regions of unnecessarily slow flow, whereas this invention allows for a contoured trough (4) cross-section which can minimize the quiescent flow regions.

FIGS. 7a, 7b and 7c are illustrations of cross-sections of the trough of the forming apparatus. The shape of the forming trough (4) cross-section is also determined by the requirements of the application, the primary one of which is the flow distribution through the trough (4) to the weirs (5). Other considerations such as ease of manufacture, erosion of the weirs (5), and stress levels in the material of construction are important. Elimination of the square lower corners of the rectangular trough (4) is important to minimize slow glass flow in these regions.

Moving Glass Under Pressure

One of the most significant modifications of the overflow glass process taught by the present inventions is using pressure to move glass through the apparatus. The pressurized flow of glass requires a smaller flow channel for a fixed quantity of glass at a defined viscosity than the apparatus in U.S. Pat. No. 3,338,696. Inducing flow by elevated pressure reduces the size of the apparatus for a given production rate. Apparatus durability often requires that parts of the device are made from or coated with refractory metal, i.e. platinum. Therefore, the use of pressure leads to lower equipment cost and the potential of higher production rates.

Since the flow rate of glass through this apparatus is governed primarily by the glass inlet pressure, the glass viscosity, the apparatus geometry and to a lesser extent by the gravitational forces, the glass sheet formed will have substantially uniform thickness over an expanded range of glass flow and glass viscosity. This will facilitate process development and allow the manufacture of substantially different products on the same apparatus.

In all embodiments described below, the glass entering the apparatus from the inflow pipe would have a static pressure between 0.025 and 5.0 bar. The specification of low or high pressure is relative to this defined pressure range.

FIGS. 8a–8c show an embodiment of a overflow glass forming apparatus (1) that would be typical of a system operating under relatively low inlet pressure. Glass (2) enters the apparatus (1) from the inflow pipe (3). The trough (4) is tapered toward the far end to minimize residence time of glass flowing to that end of the apparatus (1). The orifice (20) is on the top surface of the apparatus (1) and extends horizontally from near the inlet end to near the far end. The orifice (20) is narrow at the inlet end and very wide at the far end to accommodate for the loss in static pressure of the glass (2) as it flows to that end. The complex shape of the orifice (20) is designed to produce the desired uniform flow from the trough (4) to the sides of the apparatus (1).

FIGS. 9a–9c is an embodiment that would be typical of a higher inlet pressure than the pressure used in the embodiment shown in FIGS. 8a–8c. The orifice (20) is very narrow at the inlet end and slightly wider at the far end to accommodate for the loss in static pressure of the glass (2) as it flows to that end. The tapered shape of the orifice (20) is less exaggerated in this higher pressure embodiment as the static pressure loss due to glass flow in the trough (4) has a lower effect on flow through the orifice (20) to the sides of the apparatus (1).

Accurate and robust construction of the orifice (20) is important for the required uniform flow distribution over the duration of a production run. The orifice may be made from refractory or to increase durability the orifice (20) could be made from refractory metal, i.e. platinum, reinforced as required by refractory, i.e. alumina. The orifice (20) may be either sprayed, via a molten platinum spraying process, directly on shaped refractory or fabricated from sheet. The body of the forming apparatus (1) is most likely made from refractory. It may be clad in a refractory metal envelope to insure long life. The envelope for the refractory may be either sprayed on or fabricated from sheet.

The flow is compensated at each end of the orifice (20) to account for end effects caused by surface tension as it affects the flow down the sides of the forming apparatus (1) and the flow in the free space below the forming apparatus (1) before the glass (2) has cooled to a final form. This compensation will require a localized adjustment in the width of the orifice (20) at each end. This end compensation is be applied to each orifice (20) shape.

For constant temperature operation of the forming apparatus (1), the sheet thickness will be a function of the quantity of glass flow and glass viscosity at the root (25) (wedge shaped bottom of apparatus (1) where the glass (2) joins to form the sheet). The sheet thickness distribution (wedge) will be a primary function of the trough (4) shape and the orifice (20) shape and substantially independent of the glass flow and viscosity. During operation, any wedge in the sheet thickness may be adjusted by tilting the apparatus (1). For instance, if the glass (2) at the far end is thinner than at the inlet end, lowering the far end will flow more glass (2) to that end, consequently thickening the sheet at the far end.

FIGS. 10a–10c show an embodiment that has a simple trough (4) shape and a relatively low inlet pressure. Glass (2) enters the forming apparatus body (1) from the inflow pipe (3). The trough (4) has substantially the same cross section for the length of the apparatus (1) and access from both ends during manufacture. The orifice (20) is on the top surface of the apparatus (1) and extends horizontally from near the inlet end to near the far end. The orifice (20) is narrow at the inlet end and wider at the far end to accommodate for the loss in static pressure of the glass as it flows to that end. Note that the width change is less than the embodiment shown in FIGS. 8a–8c as the loss in static pressure of the glass (2) flowing to the far end is less. The complex (somewhat parabolic) shape of the orifice (20) is designed to produce the desired uniform flow from the trough (4) to the sides of the apparatus.

FIGS. 11a–11c show an embodiment that has a simple trough (4) shape, an orifice (20) that is not confined to a horizontal plane, and a relatively low inlet pressure. Glass (2) enters the apparatus from a inflow pipe (3). The trough (4) has substantially the same cross section for the length of the apparatus (1) and access from both ends during manufacture. The trough (4) has a pent roof shape such that a vee shaped orifice (20) may be formed. The orifice (20) is narrow at the inlet end and wider at the far end to accommodate for the loss in static pressure of the glass (2) as it flows to that end. Note that the width change is less than in FIGS. 8a–8c and 10a–10c as the loss in static pressure of the glass flowing to the far end is compensated for in part by the increase in static pressure at the far end caused by gravitational forces. The orifice (20) also has a more complex shape because of the interaction of flow and the gravitational forces. The orifice (20) is designed to produce the desired uniform flow from the trough (4) to the sides of the apparatus (1).

An advantage of this embodiment is that the orifice (20) is cut such that its exposed surfaces face either the trough (4) or the outside of the device. This general design would provide a geometry whereby both the trough (4) and the orifice (20) surface may be coated with refractory metal by a spraying process. The embodiment would, however, have a more limited range of operating flow conditions much like the apparatus in U.S. Pat. No. 3,338,696 because of the influence of gravitational forces. In some applications such as this embodiment, sloping and shaping the orifice (20) out of a horizontal plane may produce superior flow characteristics and/or provide for simplified construction. This would normally be at the expense of somewhat limiting the range of operation of a given apparatus (1).

Flow Control Plug

One of the discoveries of the present invention is that an improvement can be provided such that flow dynamics can be altered during hot operation by insertion, removal or adjustment of a flow control plug.

FIGS. 12a–12c show an embodiment that has a simple trough (4) shape and an internally mounted flow control plug (30). The orifice (20) is designed for a relatively high inlet pressure. The trough (4) has substantially the same cross section for the length of the apparatus (1) and access from both ends during manufacture. The flow control plug (30), an example shape of which is shown in FIGS. 13a–13c, is designed to modulate the flow in the trough (4) such that the static pressure at the inlet to the orifice (20) is constant along its entire length. The orifice (20) is narrow and substantially the same width its entire length. Because the static pressure change in the glass flowing through the orifice (20) is the same along its working length, a constant width orifice (20) will produce the desired uniform flow from the trough (4) to the sides of the apparatus (1).

The plug (30) can be moved vertically in the trough (4) to alter the flow distribution to cause a convex or concave shape in the sheet thickness. This can be used to compensate for the changes in sheet thickness distribution caused by apparatus degradation.

While FIGS. 13a–13c show one example of flow control plug (30), many other shapes are possible and the intention is that the plug (30) would facilitate both theoretical and empirical operational modifications to a running system, such that a particular facility might have a number of plugs (30) on hand to quickly adapt to a change in the system. For example, if wear was developing in a trending pattern that was being corrected by plugs (30), the future wear could be projected and next few plugs (30) could be designed and constructed well in advance of when they would be needed.

Another shape that would have a particular utility would be a flow control plug (30) with a conical, cylindrical, or prismatic shape. A unique irregularly shaped flow control plug (30) with an eccentric axis could be located in the center of the trough (4) or partially embedded in the bottom of the trough (4). The plug (30) could be rotated about its axis to alter the flow distribution and thereby compensate for changes in sheet thickness distribution. It could also be tilted and/or moved horizontally or vertically to produce the desired sheet thickness correction.

Multiple Orifices—Bottom Orifice

The prior art overflow process is limited in the sheet thickness that can be created using the system and there is little to no way to modify sheet thickness in an operating production run.

One embodiment of the invention provides a forming apparatus with multiple orifices to allow greater variability in sheet thickness. The forming apparatus proper consists of two independent sides that are most likely but not necessarily mirror images of each other. The outside shape is essentially that of an elongated wedge with the point facing downward. The glass enters one end of a trough formed by the two sides of the forming apparatus under pressure and flows out of a top and bottom orifice formed by the two pieces. Effectively, the bottom orifice adds glass to the middle of the formed sheet.

FIGS. 14a, 14b and 14c show a top, side and an inlet view of an embodiment with a horizontal top orifice (20), a horizontal bottom orifice (35) and a shaped trough (4). Glass (2) enters the apparatus from the inflow pipe (3). The trough (4) formed by the two independently mounted sides (36) and the end cap (34). It is tapered toward the far end to minimize the residence time of glass flowing to that end of the apparatus (1). An individual side (36) is shown in FIGS. 15a–15c. The orifice (20) on the top surface of the apparatus (1) extends horizontally from near the inlet end to near the far end. It is wider at the far end to compensate for the loss in static pressure caused by the glass flow in the trough (4). The orifice (35) on the bottom is also wider at the far end being shaped for a specified flow distribution along its length.

A significant portion of the glass (2) that forms the sheet flows out of the bottom orifice (35). The glass (2) that flows out of the top orifice (20) flows down both sloped sides of the wedge, joining at the bottom (root (25)) with the molten glass (2) from the bottom orifice (35) to form a flat sheet of molten glass (2). The molten glass (2) is subsequently cooled until it is a solid sheet and processed such that once the molten glass (2) leaves the root (25) it has essentially the same physical dimensions as a sheet formed without a bottom orifice (35).

The distribution of flow out of the horizontal trough (4) is controlled by the size and shape of each of the contoured orifices (20) and (35) at the top and bottom of the apparatus (1) and the shape of the trough (4). The sum flow of glass (2) through the top and bottom orifices (20) and (35) along the length of the forming apparatus (1) as a total must be substantially uniform in order that the sheet of glass has uniform thickness when formed. The designed shape of the trough (4) and the contoured orifices of the forming apparatus (1) are determined by the solution of the Navier-Stokes equations and confirmed by operational test.

FIGS. 16a, 16b and 16c show a top, side and an inlet view of an embodiment with a horizontal top orifice, a horizontal bottom orifice, and a constant cross section trough. Unlike the embodiment shown in FIGS. 14a–14c, the trough (4) formed by the two independently mounted sides (36) and end cap (34) and has substantially the same cross section for its total length. The orifice (20) on the top surface of the apparatus (1) extends horizontally from near the inlet end to near the far end. It is wider at the far end to compensate for the loss in static pressure caused by flow in the trough (4). The orifice (35) on the bottom is also wider at the far end being shaped for a specified flow distribution along its length. The taper of the top and bottom orifices (20) and (35) is less than the taper shown in FIGS. 14a–14c as less static pressure loss compensation is required.

The flow is compensated at each end of the forming apparatus (1) to account for end effects caused by surface tension as it affects the flow down the sides of the forming apparatus (1) and the flow in the free space below the forming apparatus (1) before the glass (2) has cooled to a final form. This compensation requires a localized adjustment in the width of the orifice (20) and/or the height of the weirs (5) at each end. This end compensation is applied to each orifice (20) shape.

The sheet thickness will be a function of the quantity of glass flow and glass viscosity at the root (25). The sheet thickness distribution (wedge) will be a primary function of the trough (4) shape and the size and shape of the orifices (20) and (35) and weirs (5). During operation, any wedge in the sheet thickness may be adjusted by tilting the apparatus (1). For instance, if the glass (2) at the far end is thinner than at the inlet end, lowering the far end will flow more glass (2) to that end, consequently thickening the sheet at the far end.

Additional wedge correction may be accomplished by selectively moving the appropriate end of the two sides (36) of the apparatus (1) together or apart to change the width of the orifices (20) and (35). At each end of the apparatus (1) there is variable width gap with a glass seal (37) that allows this movement. Applying torque to the ends of the apparatus sides (36) can effect changes in the thickness contour. Each side (36) can be bowed or made S-shape to effect a uniquely shaped orifice opening. The two sides (36) of the apparatus (1) may be adjusted by displacement, rotation, and torque relative to each other to affect the width and shape of these orifices (20) and (35).

The bottom orifice (35) may be shaped such that the glass flowing out of the center portion is thicker or thinner than that flowing out of the ends. The top orifice (20) would be designed so that the flow distribution at the root (25) is uniform. With this shape moving the individual sides (36) together or apart would produce a curvature correction in the sheet thickness.

The flow out of the top and bottom orifices (20) and (35) may be further modified by a replaceable interior plug (30) that can modify the flow to the orifices (20) and (35). This plug (30) may be used to substantially alter the width of the formed sheet to permit economical manufacture of a broad range of product widths. FIGS. 17a, 17b and 17c show a top, side and an inlet view of an embodiment which is the same as that shown in FIGS. 16a–16c, but with an internal plug (30) which is used to vary sheet width. FIGS. 18a, 18b and 18c show a top, side and an inlet view of an internal flow control plug (30) used in the embodiment shown in FIGS. 17a–17c. This plug (30) is designed to be removable while the forming apparatus (1) is at elevated temperature and to modulate the flow in the trough (4) in a manner that limits the flow of glass (2) out of each end of the top and bottom orifices (20) and (35). Use of the flow control plug (30) will control the width of the glass sheet manufactured.

FIGS. 19a, 19b and 19c show a top, side and an inlet view of an embodiment with a sloped top surface with a weir (5) on each side, a horizontal bottom orifice (35), and a shaped trough (4). This embodiment more closely resembles the apparatus of U.S. Pat. No. 3,338,696 in that it has two sloped weirs (5) on top, one on each side, instead of the top orifice (20). Unlike the device taught in the prior patent, it has a bottom orifice (35). Glass (2) enters the forming apparatus body (1) from the inflow pipe (3). The top surface of the apparatus (1) that extends horizontally from the inlet end to the far end has a downward slope to insure even glass flow out of the top of the apparatus and over the weirs (5). The trough (4) formed by the two independently mounted sides (36) is tapered, being smaller, toward the far end to control the glass flow over the weirs (5) on the top of the apparatus (1). The orifice on the bottom (35) is also shaped for a specified flow distribution along its length. It is wider at the far end to compensate for the loss in static pressure caused by flow in the trough (4).

Multiple Orifices—Side Orifices

In another embodiment of the invention, the apparatus (1) is formed by two side flow control elements (38), an end cap (34) and a bottom shaped wedge (39) creating a top and two side orifices (20) and (40). FIGS. 20a, 20b and 20c show a top, side and an inlet view of an embodiment where the elements form a horizontal top orifice (20) and two horizontal side orifices (40). FIGS. 21a, 21b and 21c show a top, side and an inlet view of the two side elements (38) and the bottom forming wedge (39) of the apparatus (1) shown in FIGS. 20a–20c.

The system would be run at a pressure equal to or higher than the local atmospheric pressure). Glass (2) enters the forming apparatus body (1) from the inflow pipe (3). The glass (2) flows into the trough (4) and exits by a top orifice (20) and two side orifices (40). The glass (2) exiting the top orifice (20) flows down the sides of the apparatus (1) to the location of the side orifices (40) and covers the glass (2) exiting from these side orifices (40). A significant portion of the glass (2) that forms the sheet flows out of each side orifice (40). The combined flows then continues down each side of the forming wedge (39) and all join at the bottom of the forming wedge (39), where they are solidified into a glass sheet.

The distribution of flow out of the horizontal trough (4) is controlled by the size and shape of each of the contoured orifices (20) and (40) at the top and sides of the apparatus (1) and the shape of the trough (4). The shape of the trough (4) may be either simple for ease of manufacture or contoured to assist in the flow and distribution of the glass (2). The orifices (20) and (40) on the top surface and sides of the apparatus (1) extend horizontally from near the inlet end to near the far end. They are wider at the far end to compensate for the loss in static pressure caused by the glass flow in the trough (4), being shaped for uniform flow along the entire orifice length. The width of and thus the flow through the side orifices (40) may be adjusted by vertical movement of the side flow control elements (38). This provides for process adjustment thus enabling different operating conditions.

The sheet thickness will be a function of the quantity of glass flow and glass viscosity at the root (25). The sheet thickness distribution (wedge) will be a primary function of the trough (4) shape and the size and shape of the orifices (20) and (40) and weirs (5). During operation, any wedge in the sheet thickness may be adjusted by tilting the apparatus (1). For instance, if the glass at the far end is thinner than at the inlet end, lowering the far end will flow more glass to that end, consequently thickening the sheet at the far end.

Wedge correction may be accomplished by selectively moving the appropriate end of either of the two sides (38) of the apparatus (1) relative to the bottom wedge (39) to change the width of the orifices (40). The two sides (38) of the apparatus (1) maybe adjusted by displacement, rotation, and torque relative to each other to affect the width and shape of the orifices (20) and (40). Each side (38) can be bowed or made S-shape to effect a uniquely shaped orifice (40) opening. A glass seal (37) at each end allows this adjustment. The sum flow of glass (2) through the top and bottom orifices (20) and (40) along the length of the forming apparatus (1) as a total must be substantially uniform in order that the sheet of glass has uniform thickness when formed. The designed shape of the trough (4) and the contoured orifices (20) and (40) of the forming apparatus (1) are determined by the solution of the Navier-Stokes equations and confirmed by operational test.

The side orifices (40) may be shaped such that the glass flowing out of the center portion is thicker or thinner than that flowing out of the ends. The top orifice (20) would be designed so that the flow distribution at the root (25) is uniform. With this shape moving the individual sides (38) vertically would produce a curvature correction in the sheet thickness.

The flow out of the top and side orifices (20) and (40) may be further modified by a replaceable interior plug (30) which can modify the flow to the orifices (20) and (40). This plug (30) may be used to substantially alter the width of the formed sheet to permit economical manufacture of a broad range of product widths. In any of the embodiments the glass flow to the orifices (20) and (40) may be altered by contouring the internal shape of the bottom forming wedge (39) element and/or the side flow control elements (38). A formed body or plug (30) attached to either of the end plates may also be used to alter the flow pattern in the trough (4). This plug (30) may be extended into the trough (4) to effectively shorten the length of the orifices such that narrower sheet may be manufactured.

A similar embodiment is shown in FIGS. 22a, 22b and 22c but the elements form a sloped top surface with weirs (5) at each side and two horizontal side orifices (40). FIGS. 23a, 23b and 23c show a top, side and an inlet view of the two side elements (38), the end cap (34) and the bottom forming wedge (39) of the apparatus shown in FIGS. 22a–22c. The glass (2) flows into the trough (4) and exits over weirs (5) on each side of the top surface and by orifices (40) on sides of the cavity. The glass exiting the top weirs (5) flows down the sides of the apparatus (1) to the location of the side orifices (40) and covers the glass exiting from these side orifices. The combined flows then continue down each side of the forming wedge (39) and all join at the bottom of the forming wedge (39), where they are solidified into a glass sheet. The weirs (5) on the top surface extend horizontally from near the inlet end to near the far end and are sloped to produce uniform flow over the entire length. The orifices (40) on the sides of the apparatus (1) extend horizontally from near the inlet end to near the far end. They are wider at the far end to compensate for the loss in static pressure caused by the glass flow in the trough (4), being shaped for uniform flow along the entire orifice length. The width of and thus the flow through the side orifices (40) may be adjusted by vertical movement of the side flow control elements (38). This provides for process adjustment thus enabling different operating conditions.

Heating and Cooling of Glass

Prior art requires that the molten glass (2) be maintained at a constant temperature in the inlet pipe (3), the full length of the trough (4), over the weirs (5) and on the upper part of the forming apparatus body (1). The glass is uniformly cooled as it approaches the root (25) of the forming apparatus body (1) in preparation to becoming a solid sheet.

Additional thickness correction may be accomplished by selective heating or cooling of the molten glass (2) in the trough (4) and/or heating the weirs and thus the molten glass (2) flowing over the weirs and/or heating the orifice (20) and thus the molten glass (2) flowing through the orifice. One caveat with this approach is that the molten glass (2) flowing from the root (25) of the apparatus (1) must be of substantially uniform temperature. Therefore, the glass molten (2) would need to be selectively cooled or heated as it flows down the outside of the apparatus in order to produce the required substantially uniform temperature.

FIGS. 24a–24c show an embodiment that has a simple trough (4) with sloped weirs (5), radiant top heating devices (42) and radiant side heating devices (44). The top heating devices (42) would be individually powered to either heat or cool the molten glass (2) as it flows through the trough (4). The lowered viscosity of the molten glass caused by a heating strategy would flow substantial molten glass (2) to the far end of the forming apparatus body (1). This heating or cooling effect could be made linear thus effecting the wedge in glass sheet thickness or nonlinear thus effecting the curvature of the glass sheet thickness. The side heating devices would be selectively powered to restore the molten glass (2) to a substantially uniform temperature as it reaches the root (25) of the forming apparatus body (1).

An additional embodiment would be an electrical heating system inserted in the trough. If the two parallel elements of the flow control plug shown in FIGS. 13a–13c were constructed as individual isolated electrodes, they may be used as a pair of electrodes for introducing electrical energy through the electrically conductive molten glass (2) from one side to the other side of the trough (4).

Numerous other methods of heating the weirs (5), the orifice (20), and/or the molten glass (3) in the trough (4) are possible. If the weirs (5) are made from molybdenum or are clad with platinum they may be used as a pair of electrodes for firing electrical energy through the electrically conductive molten glass (2) from one side to the other side of the trough (4). If either the weirs (5) or the orifice (20) are clad with platinum they may used as a conductor in an electric circuit to heat the molten glass (2). If either the weirs (5) or the orifice (20) are made from molybdenum or are clad with platinum and the flow control plug (30) is an electrode, an electric circuit may be established to heat the electrically conductive molten glass (2) in the trough (4). All of the above heating techniques would require some type of selectively powered side heating devices (44) to restore the molten glass (2) to a substantially uniform temperature as it reaches the root (25) of the forming apparatus body (1).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

an overflow device on the trough that allows at least some of the molten glass within the trough to overflow a ton of a far end of the trough without flowing over the downwardly sloping sides of the wedged shaped sheet forming structure.

2. The improved apparatus for forming sheet glass of claim 1 wherein the improvement further comprises the top of the sides of the trough being substantially curved along their length.

3. The improved apparatus for forming sheet glass of claim 1 wherein the improvement further comprises the bottom of the trough being substantially curved or chamfered to reduce areas where the molten glass flows significantly slower than the average molten glass flow rate in the trough.

4. The apparatus for forming sheet glass of claim 1 wherein the improvement further comprises heating elements that can be used to differentially heat the molten glass as it is flowing to adjust for wedge or curvature irregularities within the sheet glass being formed by the apparatus.

5. An improved apparatus for fanning sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

substantially curved top sides of the trough, wherein a substantial portion of said curved top sides has a convex upward shape, such that a substantially uniform thickness glass sheet is formed when glass flows into the trough and over the sides of the trough.

6. The apparatus for forming sheet glass of claim 5 wherein the improvement further comprises heating elements that can be used to differentially heat the molten glass as it is flowing to adjust for wedge or curvature irregularities within the sheet glass being formed by the apparatus.

7. The improved apparatus for forming sheet glass of claim 5 wherein the improvement further comprises the bottom of the trough being substantially curved or chamfered to reduce areas where the molten glass flows significantly slower than the average molten glass flow rate in the trough.

8. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

the inflow pipe shaped to modify the way molten glass flows into the trough such that the molten glass has a more uniform time dependent flow throughout the trough relative to how molten glass would flow if it passed through a cylindrical pipe.

9. The improved apparatus for forming sheet glass of claim 8 wherein the improvement further comprises the top of the sides of the trough being substantially curved along their length.

10. The improved apparatus for forming sheet glass of claim 8 wherein the improvement farther comprises the bottom of the trough being substantially curved or chamfered to reduce areas where the molten glass flows significantly slower than the average molten glass flow rate in the trough.

11. The improved apparatus for forming sheet glass of claim 8 wherein the improvement farther comprises heating elements that can be used to differentially heat the molten glass as it is flowing to adjust for wedge or curvature irregularities within the sheet glass being formed by the apparatus.

12. The improved apparatus for forming sheet glass of claim 8 wherein the improvement further comprises an overflow device on the trough that allows at least some of the molten glass within the trough to overflow the trough without flowing over the downwardly sloping sides of the wedged shaped sheet forming structure.

13. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:
   a) an internally mounted flow control plug that can be inserted and adjusted within the trough to change at least one flow characteristic of the molten glass within the trough.

14. The improved apparatus for forming sheet glass of claim 13 wherein the improvement further comprises the top of the sides of the trough being substantially curved along their length.

15. The improved apparatus for forming sheet glass of claim 13 wherein the improvement further comprises the bottom of the trough being substantially curved or chamfered to reduce areas where the molten glass flows significantly slower than the average molten glass flow rate in the trough.

16. The improved apparatus for forming sheet glass of claim 13 wherein the improvement further comprises heating elements that can be used to differentially heat the molten glass as it is flowing to adjust for wedge or curvature irregularities within the sheet glass being formed by the apparatus.

17. The apparatus for forming sheet glass of claim 13 wherein the improvement further comprises an overflow device on the trough that allows at least some of the molten glass within the trough to overflow the trough without flowing over the downwardly sloping sides of the wedged shaped sheet forming structure.

18. The apparatus for forming sheet glass of claim 17, wherein the elements of the trough are held together with a glass seal such that small adjustments in a position of the flow control plug way be made.

19. The apparatus for forming sheet glass of claim 13, wherein the elements of the trough are held together with a glass seal such that small adjustments in a position of the flow control plug may be made.

20. The apparatus for forming sheet glass of claim 13 wherein the improvement further comprises an inflow pipe shaped to modify the way molten glass flows into the trough such that the molten glass has a more uniform time dependent flow throughout the trough relative to how molten glass would flow if it passed through a cylindrical pipe.

21. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
   heating elements that can be used to differentially heat the molten glass it is flowing to adjust for wedge or curvature irregularities within the sheet glass being formed by the apparatus, wherein the heating elements heat the molten glass on a top and the sides of the wedged shaped sheet forming structure substantially before the glass from each side of the wedged shaped sheet forming structure meets at the bottom of the wedge.

22. An apparatus for forming sheet glass comprising:
   a) an inflow pipe of appropriate structure for conveying molten glass under pressure;
   b) a trough having sides and a top attached to the inflow pipe wherein the trough receives the molten glass;
   c) an orifice running along the top of the trough such that as molten glass is conveyed to the trough the molten glass exits through the orifice and passes down the sides of the trough; and
   d) a wedged shaped sheet forming structure attached to the trough and that has downwardly sloping sides converging at the bottom of the structure to form the wedge shape such that a glass sheet of substantially uniform thickness is formed when molten glass flows down the downwardly sloping sides of the wedged shaped sheet forming structure and meets at the bottom of the wedge.

23. The apparatus for forming sheet glass of claim 22 wherein the orifice is narrow along the top of the trough closest to the inflow pipe and widens for at least a portion of the length of the orifice further away from the inflow pipe such that as the glass loses static pressure as it flows through the trough the widening orifice maintains a uniform flow of glass through the orifice along its length.

24. The apparatus for forming sheet glass of claim 23 further comprising an internally mounted flow control plug that can be inserted and adjusted within the trough to change at least one flow characteristic of the molten glass within the trough.

25. The apparatus for forming sheet glass of claim 24 wherein the elements of the trough are held together with a glass seal such that adjustments in a position of the flow control plug may be made.

26. The apparatus for forming sheet glass of claim 23 wherein the bottom of the trough is curved or chamfered to reduce areas where the molten glass flows significantly slower than the average molten glass flow rate in the trough.

27. The apparatus for forming sheet glass of claim 23 wherein the shape of the inflow pipe modifies the way molten glass flows into the trough such that the molten glass has a more uniform time dependent flow throughout the trough relative to how molten glass would flow if in passed through a cylindrically shape inflow pipe.

28. The apparatus for forming sheet glass of claim 23 further comprising heating elements that can be used to differentially heat the molten glass as it is flowing to adjust for wedge or curvature irregularities within the sheet glass being formed by the apparatus.

29. The apparatus for forming sheet glass of claim 23 further comprising an orifice in the bottom of the trough that allows melted glass to flow to the bottom of the wedge shaped forming apparatus such that molten glass is added to the middle of the glass sheet being formed by the molten glass flowing down the downwardly sloped sides of the wedge shaped forming apparatus.

30. The apparatus for forming sheet glass of claim 29 wherein the elements of the trough are held together with a glass seal such that adjustments in the shape of the trough or orifices may be made.

31. The apparatus for forming sheet glass of claim 23 further comprising two orifices in the side of the trough that allow molten glass to flow to the downwardly sloped sides of the wedge shaped forming apparatus such that molten glass is added to the middle of the glass sheet being formed by the molten glass flowing down the downwardly sloped sides of the wedge shaped forming apparatus.

32. The apparatus for forming sheet glass of claim 31 wherein the top of the sides of the trough are substantially curved along their length.

33. The apparatus for forming sheet glass of claim 32 wherein the elements of the trough are held together with a glass seal such that small adjustments in the shape of the trough or orifices may be made.

34. The apparatus for forming sheet glass of claim 22 further comprising an internally mounted flow control plug that can be inserted and adjusted within the trough to change at least one flow characteristic of the molten glass within the trough.

35. The apparatus for forming sheet glass of claim 34 further comprising heating elements that can be used to differentially heat the molten glass as it is flowing to adjust for wedge or curvature irregularities within the sheet glass being formed by the apparatus.

36. The apparatus for forming sheet glass of claim 34 wherein the elements of the trough are held together with a glass seal such that adjustments in a position of the flow control plug may be made.

37. The apparatus for forming sheet glass of claim 22 wherein the bottom of the trough is curved or chamfered to reduce areas where the molten glass flows significantly slower than the average molten glass flow rate in the trough.

38. The apparatus for forming sheet glass of claim 22 wherein the shape of the inflow pipe modifies the way molten glass flows into the trough such that the molten glass has a more uniform time dependent flow throughout the trough relative to how molten glass would flow if it passed through a cylindrically shape inflow pipe.

39. The apparatus for forming sheet glass of claim 22 further comprising heating elements that can be used to differentially heat the molten glass as it is flowing to adjust for wedge or curvature irregularities within the sheet glass being formed by the apparatus.

40. The apparatus for forming sheet glass of claim 22 further comprising an orifice in the bottom of the trough that allows molted glass to flow to the bottom of the wedge shaped forming apparatus such that molten glass is added to the middle of the glass sheet being formed by the molten glass flowing down the downwardly sloped sides of the wedge shaped forming apparatus.

41. The apparatus for forming sheet glass of claim 40 wherein the elements of the trough are held together with a glass seal such that adjustments in the shape of the trough or orifices may be made.

42. The apparatus for forming sheet glass of claim 40 wherein the top of the sides of the trough being substantially curved along their length.

43. The apparatus for forming sheet glass of claim 22 further comprising two orifices in the side of the trough that allows molten glass to flow to the downwardly sloped sides of the wedge shaped forming apparatus such that molten glass is added to the middle of the glass sheet being formed by the molten glass flowing down the downwardly sloped sides of the wedge shaped forming apparatus.

44. The apparatus for funning sheet glass of claim 43 wherein the elements of the trough are held together with a glass seal such that small adjustments in the shape of the trough or orifices may be made.

45. An improved method for forming sheet glass using an apparatus that includes a trough for receiving molten glass that has sides attached to a wedged shaped sheet forming structure that has downwardly sloping sides converging at the bottom of the wedge and forming such that a glass sheet is formed when molten glass flows over the sides of the trough, down the downwardly sloping sides of the wedged shaped sheet forming structure and meets at the bottom of the wedge, wherein the improvement comprises:
   a) providing an overflow device on the trough;
   b) positioning the forming apparatus such that at least some of the molten glass within the trough passes out of a top of a far end of the trough through the overflow device without flowing over the downwardly sloping sides of the wedged shaped sheet forming structure; and
   c) flowing molten glass into the trough such that a glass sheet of substantially uniform thickness is formed.

46. The improved method for forming sheet glass of claim 45 wherein the improvement further comprises adjusting both the tilt of the trough and the amount of molten glass passing through the overflow device.

47. An improved method for forming sheet glass using an apparatus that includes a trough for receiving molten glass that has sides attached to a wedged shaped sheet forming structure that has downwardly sloping sides converging at the bottom of the wedge and forming such that a glass sheet is formed when molten glass flows over the sides of the trough, down the downwardly sloping sides of the wedged shaped sheet forming structure and meets at the bottom of the wedge, wherein the improvement comprises:
   a) providing heating elements that can differentially heat the molten glass as it flows, wherein the heating elements heat the molten class on a top and the sides of the wedged shaped sheet forming structure substantially before the glass from each side of the wedged shaped sheet forming structure meets at the bottom of the wedge; and
   b) flowing molten glass into the trough and heating the molten glass differentially to adjust for wedge or curvature irregularities such that a glass sheet of substantially uniform thickness is formed.

48. The improved method for forming sheet glass of claim 47 wherein the improvement further comprises the step of adjusting a tilt of the trough.

49. An improved method for forming sheet glass using an apparatus that includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
   a) providing the inflow pipe shaped to modify the way molten glass flows into the trough such that the molten glass has a more uniform time dependent flow throughout the trough relative to how molten glass would flow if it passed through a cylindrical pipe; and
   b) flowing molten glass into the trough such that a glass sheet of substantially uniform thickness is formed.

50. An improved method for forming sheet glass using an apparatus that includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:
   a) providing an internally mounted flow control plug that can be inserted and adjusted within the trough;
   b) using the flow control plug to adjust at least one flow characteristic of the molten glass within the trough;
   c) flowing molten glass into the trough such that a glass sheet of substantially uniform thickness is formed.

51. The improved method for forming sheet glass of claim 50, wherein the elements of the trough are held together with a glass seal such that small adjustments in a position of the flow control plug may be made.

52. The improved method for forming sheet glass of claim 50, further comprising the step of providing an overflow device on the trough.

53. The improved method for forming sheet glass of claim 52 wherein the elements of the trough are held together with a glass seal such that adjustments in a position of the flow control plug may be made.

54. The improved method for forming sheet glass of claim 52, wherein the improvement further comprises the step of adjusting a tilt of the trough.

55. The improved method for forming sheet glass of claim 50, wherein the improvement further comprises the step of adjusting a tilt of the trough.

56. A method for forming sheet glass comprising:
   a) providing an inflow pipe connected to a trough having sides and a top attached to the inflow pipe;
   b) providing an orifice running along the top of the trough;
   c) providing a wedged shaped sheet forming structure attached to the trough that has downwardly sloping sides converging at the bottom of the structure to form the wedge; and
   d) conveying molten glass under pressure through the inflow pipe into the trough such that the molten glass exits through the orifice and flows down the sides of the trough and the downwardly sloping sides of the wedged shaped sheet forming structure and meets at the bottom of the wedge and forms a glass sheet of substantially uniform thickness.

57. The method for forming sheet glass of claim 56 wherein the orifice is narrow along the top of the trough closest to the inflow pipe and widens for at least a portion of the length of the orifice further away from the inflow pipe such that as the glass loses static pressure as it flows through the trough a uniform flow of glass is maintained along the length of the widening orifice.

58. The method for forming sheet glass of claim 57 further comprising the steps of providing a flow control plug that can be inserted and adjusted within the trough and using the flow control plug to change at least one flow characteristic of the molten glass within the trough.

59. The improved method for forming sheet glass of claim 58, wherein the elements of the trough are held together with a glass seal such that small adjustments in a position of the flow control plug may be made.

60. The method for forming sheet glass claim 57 further comprising the step of heating the molten glass differentially to adjust for wedge or curvature irregularities within the sheet glass being formed by the apparatus.

61. The method for forming sheet glass claim 57 further comprising the step of providing an orifice in the bottom of the trough that allows molted glass to flow to the bottom of the wedge shaped forming apparatus such that molten glass is added to the middle of the glass sheet being formed by the molten glass flowing down the downwardly sloped sides of the wedge shaped forming apparatus.

62. The method for forming sheet glass of claim 61 wherein the elements of the trough are held together with a glass seal such that adjustments in the shape of the trough or orifices may be made.

63. The method for forming sheet glass of claim 57 further comprising the step of providing two orifices in the side of the trough that allow molten glass to flow to the downwardly sloped sides of the wedge shaped forming apparatus such that molten glass is added to the middle of the glass sheet being formed by the molten glass flowing down the downwardly sloped sides of the wedge shaped forming apparatus.

64. The method for forming sheet glass of claim 63 wherein the elements of the trough are held together with a glass seal such that small adjustments in the shape of the trough or orifices maybe made.

65. The method for forming sheet glass of claim 57 wherein the improvement further comprises the step of adjusting a tilt of the trough.

66. The method for forming sheet glass of claim 56 further comprising providing a flow control plug that can be inserted and adjusted within the trough and using the flow control plug to change at least one how characteristic of the molten glass within the trough.

67. The improved method for forming sheet glass of claim 66, wherein the elements of the trough are held together with a glass seal such that small adjustments in a position of the flow control plug may be made.

68. The method for forming sheet glass claim 56 further comprising beating the molten glass differentially to adjust for wedge or curvature irregularities within the sheet glass being formed by the apparatus.

69. The method for forming sheet glass claim 56 further comprising providing an orifice in the bottom of the trough that allows molten glass to flow to the bottom of the wedge shaped forming apparatus such that molten glass is added to the middle of the glass sheet being formed by the molten glass flowing down the downwardly sloped sides of the wedge shaped forming apparatus.

70. The method for forming sheet glass of claim 69 wherein the elements of the trough are held together with a glass seal such that adjustments in the shape of the trough or orifices may be made.

71. The method for forming sheet glass of claim 56 further comprising providing two orifices in the side of the trough that allows molten glass to flow to the downwardly sloped sides of the wedge shaped forming apparatus such that molten glass is added to the middle of the glass sheet being formed by the molten glass flowing down the downwardly sloped sides of the wedge shaped forming apparatus.

72. The method for forming sheet glass of claim 71 wherein the elements of the trough are held together with a glass seal such that small adjustments in the shape of the trough or orifices may be made.

73. The improved method for forming sheet glass of claim 56 wherein the improvement further comprises the step of adjusting a tilt of the trough.

74. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

an orifice in the bottom of the trough that allows molten glass to flow to the bottom of the wedge shaped forming apparatus such that molten glass is added to the middle of the glass sheet being formed by the molten glass flowing down the downwardly sloped sides of the wedge shaped forming apparatus and virgin glass forms an outside surface of the glass sheet.

75. The apparatus for forming sheet glass of claim 74 wherein the elements of the trough are held together with a glass seal such that adjustments in the shape of the trough or orifices may be made.

76. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of the wedge, and wherein the improvement comprises:

two orifices in the side of the trough that allow molten glass to flow to the downwardly sloped sides of the wedge shaped forming apparatus such that molten glass is added to the middle of the glass sheet being formed by the molten glass flowing down the downwardly sloped sides of the wedge shaped forming apparatus and virgin glass forms an outside surface of the glass sheet.

77. The apparatus for forming sheet glass of claim 76 wherein the elements of the trough are held together with a glass seal such that adjustments in the shape of the trough or orifices may be made.

78. The apparatus for forming sheet glass of claim 76, further comprising an overflow device on the trough that allows at least some of the molten glass within the trough to overflow a top of a far end of the trough without flowing over the downwardly sloping sides of the wedged shaped sheet forming structure.

* * * * *

UNITED STATES PATENT AND TRADEMARK OFFICE
CERTIFICATE OF CORRECTION

PATENT NO. : 6,748,765 B2
DATED : June 15, 2004
INVENTOR(S) : Richard B. Pitbladdo It is certified that error appears in the above-identified patent and that said Letters Patent is hereby corrected as shown below:

Column 15,
Line 67, replace the word "ton" with the word -- top --

Column 16,
Line 18, replace the word "fanning" with the word -- forming --
Line 63, replace the word "farther" with the word -- further --

Column 17,
Line 2, replace the word "farther" with the word -- further --
Line 51, replace the word "way" with the word -- may --

Column 18,
Line 5, add the word -- as -- between the words "glass" and "it"

Column 19,
Line 49, replace the word "molted" with the word -- molten --

Column 22,
Line 3, replace the word "molted" with the word -- molten --
Line 36, replace the word "beating" with the word -- heating --

Signed and Sealed this

Fifteenth Day of February, 2005

JON W. DUDAS
*Director of the United States Patent and Trademark Office*